US012654437B2

(12) United States Patent
Aoyagi

(10) Patent No.: US 12,654,437 B2
(45) Date of Patent: Jun. 16, 2026

(54) IMAGE INSPECTION APPARATUS, SYSTEM, METHOD, AND STORAGE MEDIUM FOR SETTING ABNORMALITY DETECTION CONDITIONS OF PRINT MEDIUM

(71) Applicant: Kohta Aoyagi, Kanagawa (JP)

(72) Inventor: Kohta Aoyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 18/494,095

(22) Filed: Oct. 25, 2023

(65) Prior Publication Data

US 2024/0165945 A1 May 23, 2024

(30) Foreign Application Priority Data

Nov. 18, 2022 (JP) ................................. 2022-184521

(51) Int. Cl.
 *G06T 7/00* (2017.01)
 *B41F 33/00* (2006.01)
(52) U.S. Cl.
 CPC ........ *B41F 33/0036* (2013.01); *G06T 7/0004* (2013.01); *G06T 2207/10008* (2013.01); *G06T 2207/30144* (2013.01)
(58) Field of Classification Search
 CPC ................ G06T 7/0002; G06T 7/0004; G06T 2207/30168; G06T 2207/30144; B41F 33/0036
 USPC ........................ 382/112, 275; 399/94, 97, 15
 See application file for complete search history.

(56) References Cited

U.S. PATENT DOCUMENTS

| | | | |
|---|---|---|---|
| 2016/0142560 A1 | 5/2016 | Shijoh | |
| 2017/0210581 A1* | 7/2017 | Van Acquoij | ............. B41J 3/60 |
| 2018/0141329 A1 | 5/2018 | Aoyagi et al. | |
| 2018/0147835 A1 | 5/2018 | Nakamura et al. | |
| 2019/0163112 A1 | 5/2019 | Nikaku et al. | |
| 2019/0166271 A1 | 5/2019 | Yamazaki et al. | |
| 2019/0202648 A1 | 7/2019 | Nakayama et al. | |
| 2020/0096925 A1* | 3/2020 | Ikuta | .................... G06F 3/1259 |
| 2020/0296243 A1 | 9/2020 | Aoyagi et al. | |
| 2020/0301326 A1 | 9/2020 | Yamazaki et al. | |
| 2021/0016584 A1 | 1/2021 | Aoyagi et al. | |
| 2021/0165355 A1 | 6/2021 | Yamazaki et al. | |
| 2021/0166096 A1 | 6/2021 | Yamazaki et al. | |
| 2021/0168253 A1 | 6/2021 | Nakayama et al. | |
| 2021/0297543 A1 | 9/2021 | Nakayama et al. | |

(Continued)

FOREIGN PATENT DOCUMENTS

| | | | |
|---|---|---|---|
| JP | 2013122560 A | * | 6/2013 |
| JP | 2016-103815 A | | 6/2016 |

(Continued)

*Primary Examiner* — Jamares Q Washington
(74) *Attorney, Agent, or Firm* — IPUSA, PLLC

(57) ABSTRACT

An image inspection apparatus includes processing circuitry. The processing circuitry sets abnormality detection conditions excluding specific conditions specified from at least one of input image information related to input image data and print medium information related to a print medium. The processing circuitry acquires an image formed on the print medium based on the input image data. The processing circuitry detects whether an abnormality satisfying the abnormality detection conditions excluding the specific conditions has occurred in the acquired image.

14 Claims, 18 Drawing Sheets

(56)      References Cited

U.S. PATENT DOCUMENTS

| | | | |
|---|---|---|---|
| 2022/0219932 A1 | 7/2022 | Yamazaki et al. | |
| 2022/0263963 A1 | 8/2022 | Aoyagi et al. | |
| 2022/0286572 A1 | 9/2022 | Nakayama et al. | |
| 2022/0286576 A1 | 9/2022 | Ishitsuka et al. | |
| 2022/0291618 A1 | 9/2022 | Yamazaki et al. | |
| 2022/0318582 A1 | 10/2022 | Ishii et al. | |
| 2022/0321708 A1 | 10/2022 | Matsumoto et al. | |
| 2023/0010640 A1 | 1/2023 | Konno et al. | |
| 2023/0401407 A1 * | 12/2023 | Ohira ................... | G06F 3/1204 |

FOREIGN PATENT DOCUMENTS

| | | | |
|---|---|---|---|
| JP | 2020-094891 A | 6/2020 | |
| JP | 2020-150329 A | 9/2020 | |
| JP | 2021-140468 A | 9/2021 | |
| JP | 2021144414 A | * 9/2021 | |
| JP | 2021-194794 A | 12/2021 | |

* cited by examiner

FIG. 2

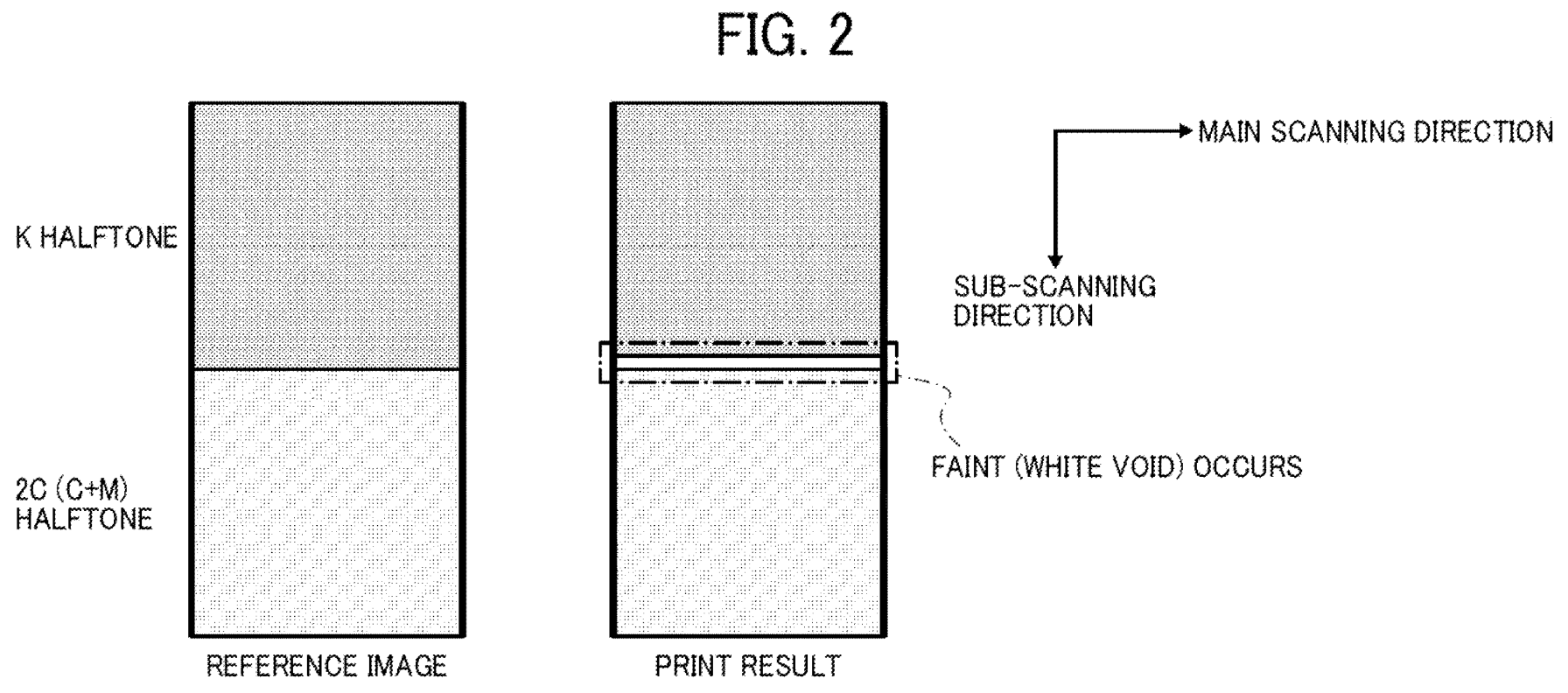

MAIN SCANNING DIRECTION

SUB-SCANNING DIRECTION

FAINT (WHITE VOID) OCCURS

PRINT RESULT

REFERENCE IMAGE

K HALFTONE 2C (C+M) HALFTONE

MAIN SCANNING DIRECTION

SUB-SCANNING DIRECTION

15 MILLIMETERS (mm) FROM REAR END OF PRINT MEDIUM P

PRINT MEDIUM P

CONVEYANCE DIRECTION OF PRINT MEDIUM P

CONSTRAINT IMAGE CONDITION MANAGEMENT TABLE

| CONSTRAINT CONDITION IDENTIFICATION INFORMATION | IMAGE CONDITION | ENVIRONMENTAL CONDITION | REGION TO BE EXCLUDED FROM THE ABNORMALITY DETECTION TARGET |
|---|---|---|---|
| I1001 | IMAGE CONDITION X: HIGH-DENSITY HT + 2HCT | ENVIRONMENTAL CONDITION A: 10°C±3°C, 15%±5% | NONE |
| I1002 | IMAGE CONDITION Y: LOW-DENSITY HT + 2HCT | ENVIRONMENTAL CONDITION B: 20°C±3°C, 30%±5% | 5 mm AROUND PLACE OF ABNORMALITY OCCURRENCE |
| I1003 | IMAGE CONDITION Y: LOW-DENSITY HT + 2HCT | ENVIRONMENTAL CONDITION C: 25°C±3°C, 50%±5% | 10 mm AROUND PLACE OF ABNORMALITY OCCURRENCE |
| I1004 | IMAGE CONDITION Y: LOW-DENSITY HT + 2HCT | ENVIRONMENTAL CONDITION D: 30°C±3°C, 70%±5% | 25 mm AROUND PLACE OF ABNORMALITY OCCURRENCE |
| I1005 | IMAGE CONDITION Y: LOW-DENSITY HT + 2HCT | ENVIRONMENTAL CONDITION A: 10°C±3°C, 15%±5% | 5 mm AROUND PLACE OF ABNORMALITY OCCURRENCE |
| I1006 | IMAGE CONDITION Z: HT (NUMBER OF SCREEN LINES = 700) | ENVIRONMENTAL CONDITION B: 20°C±3°C, 30%±5% | 10 mm AROUND PLACE OF ABNORMALITY OCCURRENCE |
| ... | ... | ... | ... |

FIG. 10

CONSTRAINT MEDIUM CONDITION MANAGEMENT TABLE

| CONSTRAINT CONDITION IDENTIFICATION INFORMATION | MEDIUM CONDITION | ENVIRONMENTAL CONDITION | REGION TO BE EXCLUDED FROM THE ABNORMALITY DETECTION TARGET |
|---|---|---|---|
| I2001 | PRINT MEDIUM A: PLAIN PAPER | ENVIRONMENTAL CONDITION C: 25°C±3°C, 50%±5% | NONE |
| I2002 | PRINT MEDIUM B: THICK PAPER | ENVIRONMENTAL CONDITION B: 20°C±3°C, 30%±5% | 10 MILLIMETERS (mm) FROM REAR END OF PRINT MEDIUM P |
| I2003 | PRINT MEDIUM C: THICK COATED PAPER | ENVIRONMENTAL CONDITION B: 20°C±3°C, 30%±5% | 15 MILLIMETERS (mm) FROM REAR END OF PRINT MEDIUM P |
| I0004 | PRINT MEDIUM C: THICK COATED PAPER | ENVIRONMENTAL CONDITION A: 10°C±3°C, 15%±5% | 30 MILLIMETERS (mm) FROM REAR END OF PRINT MEDIUM P |
| ... | ... | ... | |

FIG. 11

CONSTRAINT SETTING MANAGEMENT TABLE

| CONSTRAINT CONDITION IDENTIFICATION INFORMATION | REGION TO BE EXCLUDED FROM THE ABNORMALITY DETECTION TARGET (COORDINATES IN IMAGE) | | |
|---|---|---|---|
| I2003 | (1.9566, 7016.9921) | | |
| I1002, I1005 | (3968.7883, 4086.8119) | | |
| ... | ... | | |
| ... | ... | | |

FIG. 18

CONSTRAINT CONDITION MANAGEMENT TABLE

| CLASSIFICATION | DETERMINATION CRITERIA | PRECONDITION |
|---|---|---|
| TYPE OF PRINT MEDIUM | COATED PAPER (GLOSS COATED PAPER) | |
| BASIS WEIGHT | 230 g/m$^2$ OR MORE | |
| VOLUME RESISTIVITY [$\Omega \cdot cm$] | 1.0E + 11 OR MORE | |
| OCCURRENCE POSITION OF ABNORMAL IMAGE | 15 MILLIMETERS (mm) FROM REAR END OF PRINT MEDIUM | ✓ |
| ENVIRONMENT | TEMPERATURE: 15 °C HUMIDITY: 20% OR UNDER | |
| . . . | . . . | . . . |

IMAGE INSPECTION APPARATUS, SYSTEM, METHOD, AND STORAGE MEDIUM FOR SETTING ABNORMALITY DETECTION CONDITIONS OF PRINT MEDIUM

CROSS-REFERENCE TO RELATED APPLICATION

This patent application is based on and claims priority pursuant to 35 U.S.C. § 119(a) to Japanese Patent Application No. 2022-184521, filed on Nov. 18, 2022, in the Japan Patent Office, the entire disclosure of which is hereby incorporated by reference herein.

BACKGROUND

Technical Field

Embodiments of the present disclosure relate to an image inspection apparatus, an image forming apparatus, an image inspection system, an image inspection method, and a storage medium.

Related Art

Various types of techniques are known in which multiple threshold values are adjusted to meet a criterion intended by a user in detecting a defect in a printed material to determine whether the printed material is good quality.

One of the techniques described above changes the defect detection level of an apparatus to detect a defect of a printed material in accordance with an environment in which the printed material is used.

SUMMARY

Embodiments of the present disclosure described herein provide a novel image inspection apparatus including processing circuitry. The processing circuitry sets abnormality detection conditions excluding specific conditions specified from at least one of input image information related to input image data and print medium information related to a print medium. The processing circuitry acquires an image formed on the print medium based on the input image data. The processing circuitry detects whether an abnormality satisfying the abnormality detection conditions excluding the specific conditions has occurred in the acquired image.

Embodiments of the present disclosure described herein provide a novel image forming apparatus including the image inspection apparatus and at least one image forming unit. The image forming unit forms the image on the print medium based on the input image data.

Embodiments of the present disclosure described herein provide a novel image inspection system including a management server, an image forming apparatus, and an image inspection apparatus. The management server includes server circuitry. The image forming apparatus includes an image forming unit. The image inspection apparatus inspects the image formed on the printing medium. The image inspection apparatus includes processing circuitry. The server circuitry generates input image data and transmit input image information related to the input image data and print medium type information indicating a type of a print medium to the image forming apparatus. The image forming unit forms an image on the print medium based on the input image data. The processing circuitry sets abnormality detection conditions excluding specific conditions specified from at least one of the input image information related to the input image data and print medium information related to the print medium. The processing circuitry acquires the image formed on the print medium. The processing circuitry detects whether an abnormality satisfying the abnormality detection conditions excluding the specific conditions has occurred in the acquired image. Embodiments of the present disclosure described herein provide a novel image inspection method executed by an image inspection apparatus that inspects an image formed on a print medium. The method includes: setting abnormality detection conditions excluding specific conditions specified from at least one of input image information related to input image data and print medium information related to a print medium; acquiring an image formed on the print medium based on the input image data; and detecting whether an abnormality satisfying the abnormality detection conditions excluding the specific conditions has occurred in the acquired image.

Embodiments of the present disclosure described herein provide a novel non-transitory, computer-readable storage medium storing computer-readable program code that causes an image inspection apparatus to perform: setting abnormality detection conditions excluding specific conditions specified from at least one of input image information related to input image data and print medium information related to a print medium; acquiring an image formed on the print medium based on the input image data; and detecting whether an abnormality satisfying the abnormality detection conditions excluding the specific conditions has occurred in the acquired image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a diagram illustrating a constraint on an image, based on image data, according to an embodiment of the present disclosure;

FIG. 4 is a diagram illustrating an internal configuration of an image forming system according to an embodiment of the present disclosure;

FIG. 9 is a conceptual diagram illustrating a constraint image condition management table according to an embodiment of the present disclosure;

FIG. 10 is a conceptual diagram illustrating a constraint medium condition management table according to an embodiment of the present disclosure;

FIG. 11 is a conceptual diagram illustrating a constraint setting management table according to an embodiment of the present disclosure;

FIG. 18 is a conceptual diagram illustrating a constraint condition management table according to a second embodiment of the present disclosure;

Figure 1:
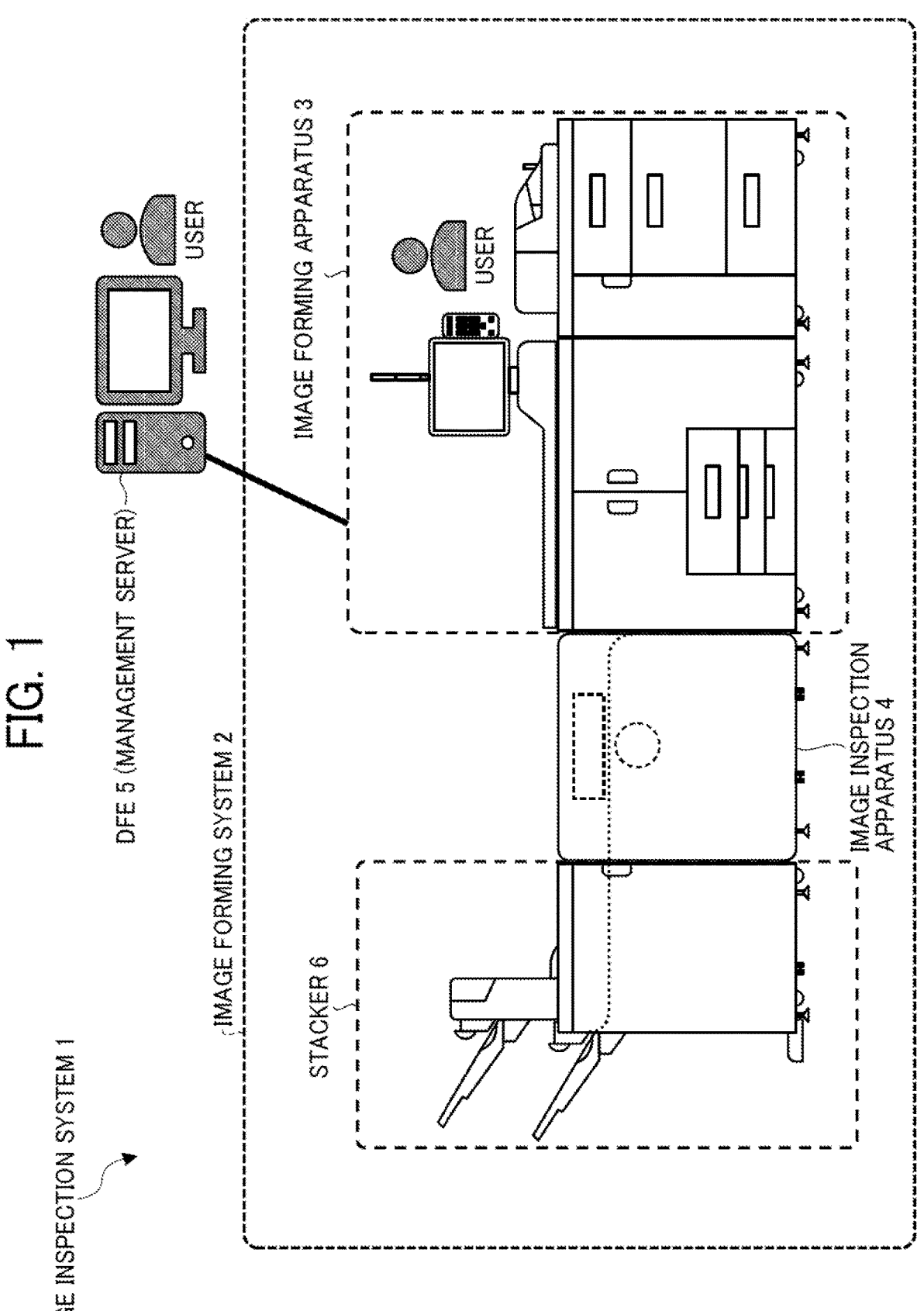
FIG. 1 is a diagram illustrating an overall configuration of an image inspection system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of an image inspection apparatus, an image forming apparatus, an image inspection system, an image inspection method, and a storage medium according to embodiments of the present disclosure with reference to the drawings. In the description given below with reference to the drawings, like reference signs denote like elements, and overlapping description may be simplified or omitted as appropriate.

First Embodiment

FIG. 1 is a diagram illustrating an overall configuration of an image inspection system according to an embodiment of the present disclosure.

As illustrated in FIG. 1, the image inspection system 1 includes an image forming apparatus 3, an image inspection apparatus 4, and a digital front end (DFE) 5 that serves as a management server. In the image inspection system 1, the image forming apparatus 3 and the DFE 5 are connected to each other by a wired cable. However, the image forming apparatus 3 and the DFE 5 may be connected to each other via a communication network capable of performing wireless communication. The communication network is a communication network through which an unspecified number of communications are established, and is implemented by, for example, the Internet, an intranet, or a local area network (LAN). The communication network may be a wireless communication network in compliance with, for example, the fourth generation (4G), the fifth generation (5G), worldwide interoperability for microwave access (WiMAX), or long term evolution (LTE).

The image forming apparatus 3 is an apparatus that forms an image on a print medium based on input image data. The image forming apparatus 3 is, for example, a multifunction peripheral (MFP), multifunction product, or multifunction printer. The MFP forms an image on a print medium based on an operation panel that receives various settings by a user, a read document, or input image data that is input.

The image inspection apparatus 4 is a device that inspects an image formed on a print medium. Similarly to the image forming apparatus 3 described above, the image inspection apparatus 4 includes a reader that reads an image formed on the print medium, detects (inspects) an abnormal image occurring on the print medium, and transmits a predetermined notification to the image forming apparatus 3.

The DFE 5 may be simply referred to as "DFE 5" in the following description. The DFE 5 is a management server capable of generating an input image for forming an image. The DFE 5 is implemented by an information processing apparatus (computer system) for communication, installed with, for example, a general-purpose operating system (OS). The DFE 5 is one of the components configuring the image inspection system.

The DFE 5 may be implemented by a single computer such as a general-purpose personal computer, a portable laptop personal computer, a cellphone, a smartphone, or a tablet computer. Alternatively, the DFE 5 may be implemented by multiple computers to which divided portions such as storages (functions or means) are allocated as desired. In another example, the information processing server 70 is configured as a plurality of computers to which divided units (functions, means, or storages) are arbitrarily allocated. All or a part of the functions of the DFE 5 may be implemented by a server computer residing on a cloud network or a server computer residing on an on-premises network. Alternatively, the DFE 5 may be a communication device or a communication terminal on which software, such as browser software and various application software, operates.

Based on the above-described system configuration, in the present embodiment, the image inspection system 1 is provided, and the image inspection system 1 (specifically image inspection apparatus 4) can easily distinguish between an abnormality that is not to be detected and an abnormality that is to be detected for an abnormality that occurs in an image formed on a print medium.

In the present embodiment, "abnormality" occurring in an image refers to a state including a defect or a stain in an image formed on a print medium such as paper.

In the present embodiment, such a state as described above is compared with a master image, and it is determined from the result of the comparison as to whether the state is detected as an abnormality which is not processed as a constraint represented by a "constraint". According to such an idea, for example, a white void image in which an image of a predetermined distance is missing at a switching portion of a plate for each color forming an image, and an abnormal image occurring at a predetermined distance from the rear end of the print medium with respect to the conveyance direction of the print medium are defined as constraint targets.

In the present embodiment, as described later, an abnormal image (a defect in an image) that cannot be avoided is present. The abnormal image depends on printing conditions such as the ability of the image forming apparatus, the type of the print medium (sheet of paper), the basis weight, the temperature and humidity, and the toner coverage. The abnormal image may be simply referred to as "abnormal image" in the following description. The image forming apparatus may continue to be used, with the user's approval, even the abnormal image is present. In such cases, such abnormal images are processed as the "constraint." Typically, the cause of the occurrence of the abnormal image as the constraint is due to the image and the print medium. A description is given below of the constraint in each case.

A description is given below of the constraint.

FIG. 2 is a diagram illustrating the constraint on the image, based on image data, according to an embodiment of the present disclosure.

As illustrated in FIG. 2, it is assumed that a reference image having a K halftone (in this case, the "K halftone" refers to a "black color halftone") and a 2C halftone (in this case, the "2C halftone" refers to a "cyan color and magenta color halftone") is formed (printed) as a reference image in the main scanning direction and the sub-scanning direction as illustrated in FIG. 2. In this case, as illustrated in the "PRINT RESULT" of FIG. 2, an abnormal image indicating a faint (white void) occurs between the K halftone and the 2C halftone. In this case, an occurrence tendency and an occurrence mechanism of the abnormal image may be, for example, the following conditions.

The abnormal image notably occurs in light halftones. A screen with a high number of screen lines is disadvantageous, and a character is disadvantageous when a halftone mode is the default setting (300 lines per inch). The edge of the 2C halftone may appear to change color. The gap between adjacent halftones appears to be a blank image. In hot and humid environments, the occurrence tendency of the abnormal image is exacerbated. The occurrence tendency of the abnormal image is exacerbated when the number of screen lines of the halftone is high. The occurrence tendency of the abnormal image is exacerbated when the halftone density is low. However, the occurrence tendency and the occurrence mechanism of the abnormal image are not limited to the conditions described above.

Based on the above-described information, an image pattern (density, color, arrangement), a halftone mode setting, and environment estimation can be performed. In other words, a predetermined condition and a predetermined value can be set for determining that the image is a constraint image which is not regarded as an abnormal image, based on information such as the type of image data, an environment, and an occurrence position of the abnormal image when the abnormal image described above occurs.

A description is given below of another example of the constraint.

Figure 3:
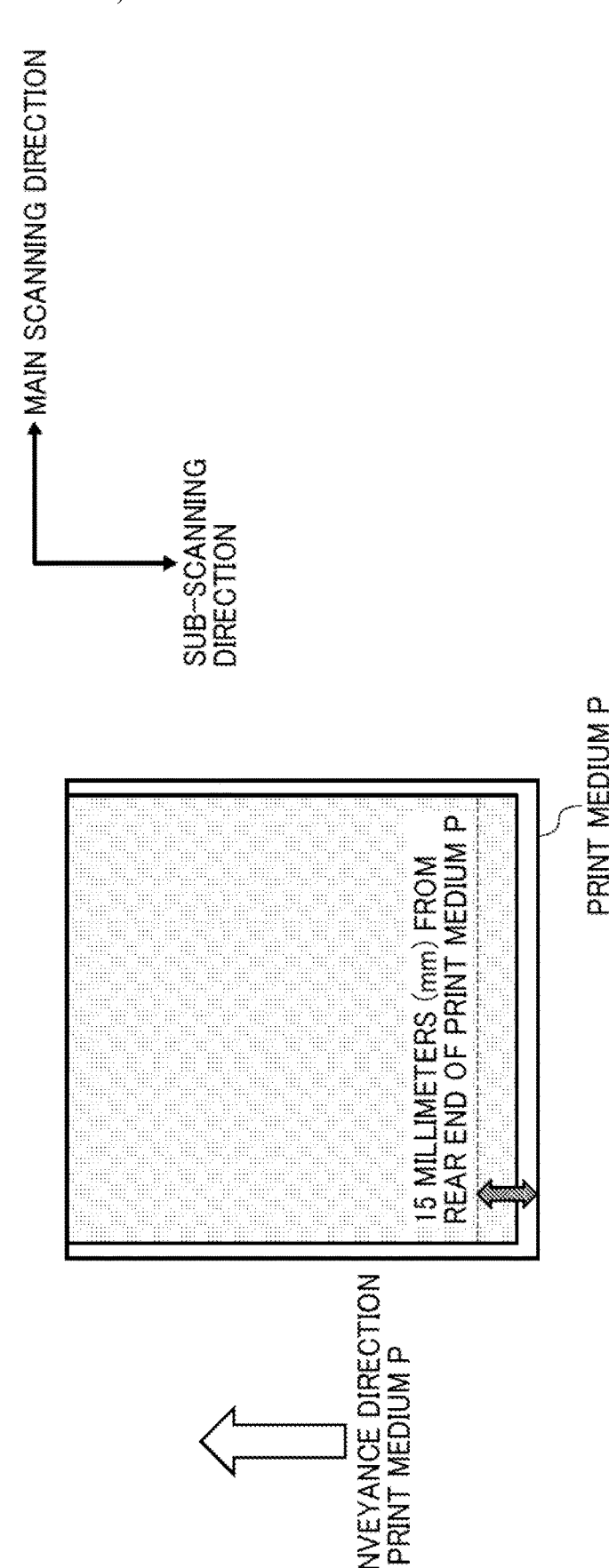
FIG. 3 is a diagram illustrating a constraint on an image, based on a print medium, according to an embodiment of the present disclosure.

FIG. 3 is a diagram illustrating the constraint on the image, based on the print medium, according to an embodiment of the present disclosure.

In the present embodiment, when a print medium P is conveyed in the sub-scanning direction as illustrated in FIG. 3, the abnormal image described below is known to occur near 15 millimeters (mm) from the rear end of the print medium P. In this case, an occurrence tendency and an occurrence mechanism of the abnormal image may be, for example, the following conditions.

The abnormal image is likely to occur on a coated paper.

The abnormal image is likely to occur on a high resistive paper.

The abnormal image is likely to occur on a thick paper.

The degree of the abnormal image is worse in the low temperature and low humidity environment. However, the occurrence tendency and the occurrence mechanism of the abnormal image are not limited to the conditions described above.

In this case, since the occurrence position of the abnormal image on the print medium is known to be around 15 millimeters from the rear end of the print medium, the type of the print medium to be used, the environment, and the occurrence position of the abnormal image can be estimated. In other words, a predetermined condition and a predetermined value can be set to determine that the image is a constraint image which is not regarded as an abnormal image, based on information such as the type of the print medium, the environment, and the occurrence position of the abnormal image when the abnormal image described above occurs.

Since the abnormal image and the occurrence mechanism of the abnormal image to be generated vary depending on the configuration of the apparatus, the condition related to the constraint as described above is not limited thereto.

Figure 4:
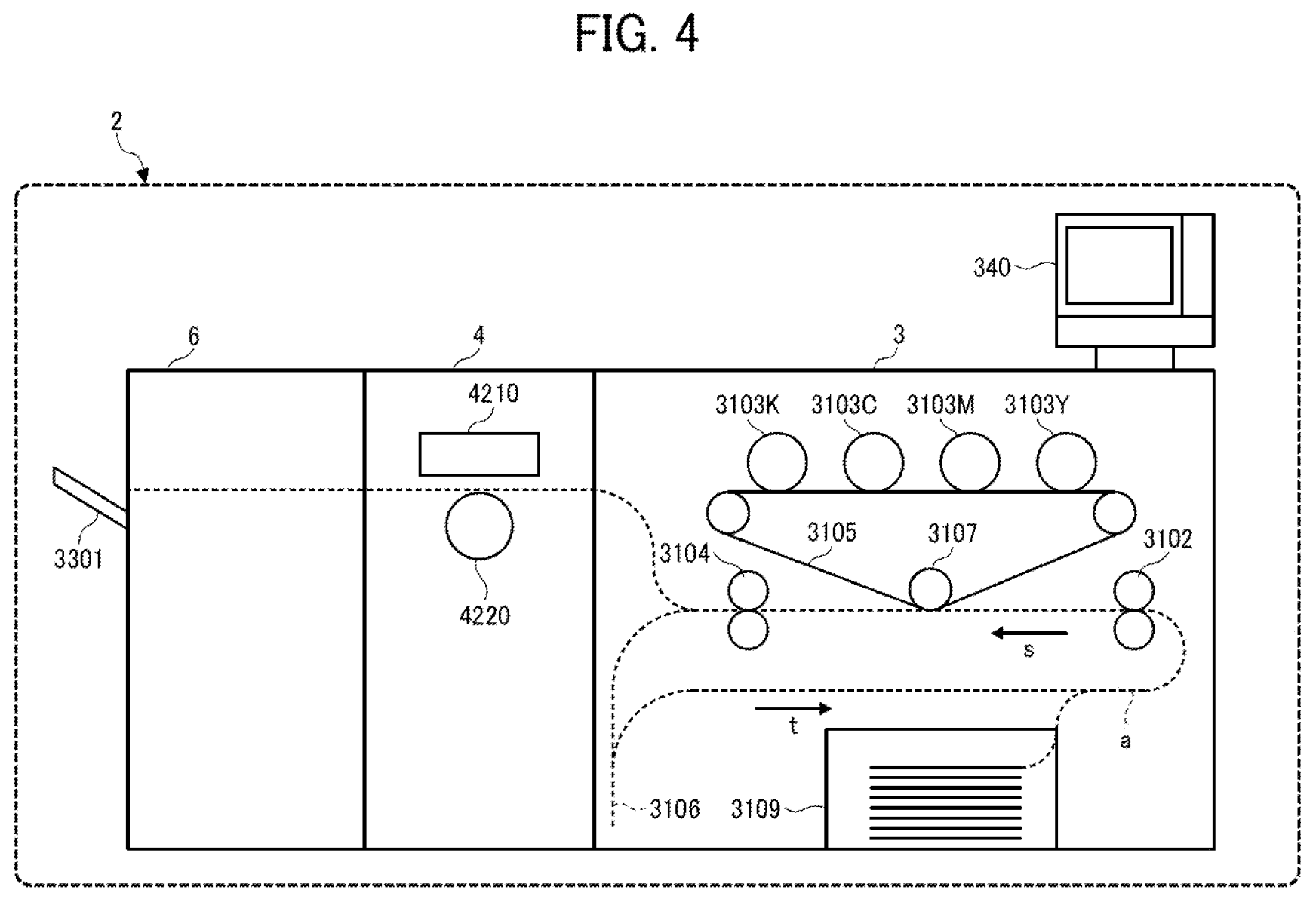

FIG. 4 is a diagram illustrating an internal configuration of an image forming system 2 according to an embodiment of the present disclosure.

As illustrated in FIG. 4, the image forming system 2 includes the image forming apparatus 3, the image inspection apparatus 4, and a stacker 6. The image inspection apparatus 4 detects an abnormality (defect) of an image formed on a print medium by the image forming apparatus 3. The stacker 6 functions as a part of the image forming apparatus 3.

The image forming apparatus 3 includes an operation panel 340, tandem-type electrophotographic image forming units 3103Y, 3103M, 3103C, and 3103K, a transfer belt 3105, a secondary transfer roller 3107, a sheet feeder 3109, a pair of conveyance rollers 3102, a fixing roller 3104, and a sheet reverse passage 3106.

The operation panel 340 is an operation display unit that performs various operation inputs and displays various screens for the image forming apparatus 3 and the image inspection apparatus 4.

A toner image is formed on each of the image forming units 3103Y, 3103M, 3103C, and 3103K by an image forming process (a charging process, an exposing process, a developing process, a transfer process, and a cleaning process). The toner image formed on each of the image forming units 3103Y, 3103M, 3103C, and 3103K is transferred onto the transfer belt 3105. In the present embodiment, a yellow toner image is formed on the image forming unit 3103Y, a magenta toner image is formed on the image forming unit 3103M, a cyan toner image is formed on the image forming unit 3103C, and a black toner image is formed on the image forming unit 3103K. However, the arrangement order of the image forming units 3103Y, 3103M, 3103C, and 3103K is not limited to the order described above and may be appropriately changed. The image forming apparatus 3 may include an image forming unit that forms a toner image of a color other than yellow, magenta, cyan, and black.

The color other than yellow, magenta, cyan, and black is, for example, white. The transfer belt 3105 conveys full-color toner images superimposed and transferred by the image forming units 3103Y, 3103M, 3103C, and 3103K to a secondary transfer position of the secondary transfer roller 3107. In the present embodiment, a yellow toner image is first transferred (primary image transfer) onto the transfer belt 3105, and then a magenta toner image, a cyan toner image, and a black toner image are sequentially superimposed and transferred onto the transfer belt 3105. However, the order in which the toner images of the respective colors are transferred to the transfer belt 3105 is not limited to the order described above and may be appropriately changed. The image forming units 3103Y, 3103M, 3103C, and 3103K are referred to as an image forming unit(S) 3103 in the following description unless otherwise particularly distinguished.

The sheet feeder 3109 accommodates multiple print media in a superposed manner and feeds each print medium of the multiple print media one by one. Example of the print medium include recording paper (transfer paper). However, the print medium is not limited to this, and the examples of the print medium may include medium capable of forming (printing) images such as coated paper, thick paper, overhead projector (OHP) sheets, plastic films, a prepreg, and copper foil.

The pair of conveyance rollers 3102 conveys the print medium fed from the sheet feeder 3109 in a direction indicated by arrow "s" on a conveyance passage "a" in FIG. 4.

The secondary transfer roller 3107 collectively transfers the full-color toner images conveyed by the transfer belt 3105 onto the print medium conveyed by the pair of conveyance rollers 3102 at the secondary transfer position.

The fixing roller pair 3104 applies heat and pressure to the print medium bearing the full-color toner image to fix the full-color toner image onto the print medium.

In the case of single-sided printing, the image forming apparatus 3 sends the print medium on which the full-color toner image is fixed to the image inspection apparatus 4. On the other hand, in the case of double-sided printing, the image forming apparatus 3 sends the print medium, on which the full-color toner images have been fixed, to the sheet reverse passage 3106.

By switching back the fed print medium, the front and back faces of the print medium are reversed in the sheet reverse passage 3106. Then, the reversed print medium is conveyed in the direction of the arrow "t" in FIG. 4. After the print medium conveyed through the sheet reverse passage 3106 is conveyed again by the pair of conveyance rollers 3102, a full-color toner image is transferred onto the back face of the print medium opposite to the previously transferred face (front face) by the secondary transfer roller 3107. The full-color toner image transferred on the back face of the print medium is fixed to the back face by the fixing roller pair 3104. Thereafter, the print medium is sent to the stacker 6 of the image forming apparatus 3 via the image inspection apparatus 4.

The image inspection apparatus 4 is disposed downstream from the image forming apparatus 3 in a conveyance direction of the print medium. The image inspection apparatus 4 includes a reading device 410 and a background unit 420.

The image inspection apparatus 4 detects at least one of the edge position of the print medium sent from the image forming apparatus 3 and the edge position of the image formed on the print medium. The image inspection apparatus 4 ejects the print medium to the stacker 6 of the image forming apparatus 3 after the image inspection apparatus 4 has finished detecting the print medium. The configuration of the image inspection apparatus 4 is described later in detail with reference to FIG. 5.

The stacker 6 includes an output tray 3301. The stacker 6 stacks the print medium ejected from the image inspection apparatus 4 on the output tray 3301.

Figure 5:
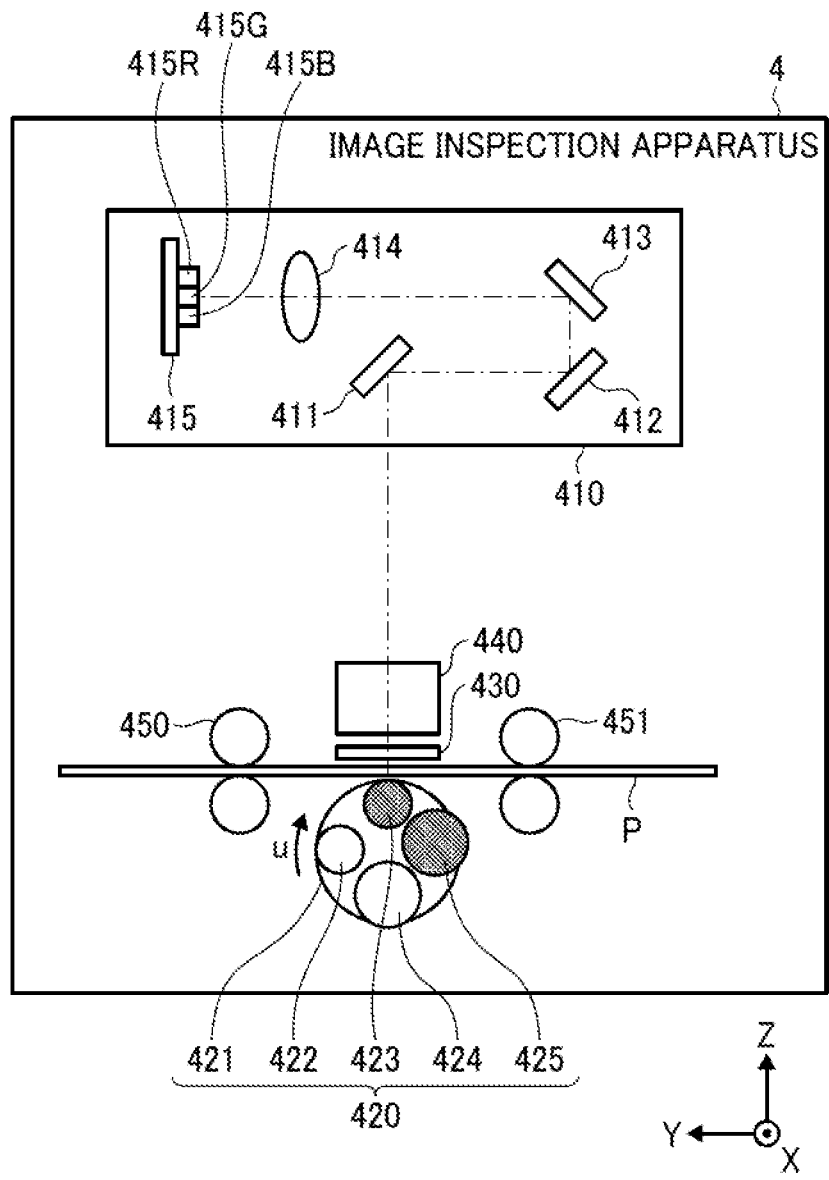
FIG. 5 is a diagram illustrating an internal configuration of an image inspection apparatus according to an embodiment of the present disclosure.

FIG. 5 is a diagram illustrating an internal configuration of the image inspection apparatus 4 according to an embodiment of the present disclosure.

As illustrated in FIG. 5, the image inspection apparatus 4 includes the reading device 410, the background unit 420, an exposure glass 430, an illumination unit 440, and conveyance roller pairs 450 and 451.

The conveyance roller pairs 450 and 451 convey the print medium P sent from the image forming apparatus 3 in the Y-direction in FIG. 5. One of the conveyance roller pairs 450 and 451 may be a driving roller pair that is rotationally driven by a driver such as a motor, and the other may be a driven roller pair that rotates in accordance with the conveyed print medium P.

The exposure glass 430 is made of transparent glass, contacts the conveyed print medium P, and has a function to reduce fluttering of the print medium P when the reading device 410 reads (images) print medium P. As illustrated in FIG. 5, the print medium Pis conveyed between the exposure glass 430 and the background unit 420 in the Y-direction.

The illumination unit 440 is configured by a light emitting device (LED) array in which multiple light emitting diodes (LEDs) are disposed in an axial direction (X-direction in FIG. 5, the axial direction is referred to as a "width direction" in the following description) of the conveyance roller pair 450 and illuminates the conveyed print medium P with linear light. However, the illumination unit 440 is not limited to this configuration described above and may emit light having a wide wavelength band close to white light by simultaneously turning on the LEDs of the respective colors of red, green, and blue and mixing the light of the respective colors. The illumination unit 440 may be configured to include one element that emits linear light elongated in the width direction, such as a fluorescent tube. The fluorescent tube can emit white light with uniform brightness in the width direction.

The illumination unit 440 may use a light guide member whose longitudinal direction is the width direction, turn on white LEDs or red, green, and blue LEDs disposed at both ends of the light guide member, and emit linear light through the light guide member. The light guide member can emit light having uniform brightness in the width direction. The illumination unit 440 may use a light guide lens for efficiently guiding light from the LED array to a region through which an edge in the width direction of the conveyed print medium P passes.

The reading device 410 is disposed on one surface side (Z-direction positive side in FIG. 5) of the print medium. The reading device 410 is implemented by a contact image sensor (CIS). More specifically, the reading device 410 includes mirrors 411 to 413, a lens 414, and a pixel array 415. The reflected light from the print medium P of the light emitted from the illumination unit 440 is reflected by each of the mirrors 411 to 413 and is imaged on a light receiving surface of the pixel array 415 by the lens 414 as illustrated by the dashed line in FIG. 5.

The pixel array 415 is an element in which photo diodes (PDs), which are photoelectric conversion elements that convert optical signals into electrical signals, are disposed in an array in the width direction. One photoelectric conversion element corresponds to one pixel and outputs an electrical signal corresponding to the amount of received light. The pixel array 415 outputs electrical signals (image signals) of pixels for one line in the width direction. At this time, the pixel array 415 receives reflected light from the print medium P conveyed in the Y-direction by the conveyance roller pairs 450 and 451 at each predetermined point in time, and outputs an image signal for one line. At this time, the pixel array 415 receives reflected light from the print medium P conveyed in the Y-direction by the conveyance roller pairs 450 and 451 at each predetermined timing, and outputs an image signal for one line. The reading device 410 connects the image signals for one line output in this manner in a direction orthogonal to the arrangement direction of the pixels in the pixel array 415 to acquire two-dimensional image data.

The pixel array 415 includes a pixel array 415R that receives red light, a pixel array 415G that receives green light, and a pixel array 415B that receives blue light. The width direction of each of the pixel array 415R, the pixel array 415G, and the pixel array 415B is substantially parallel to the direction in which the pixels are arrayed.

The pixel array 415R that receives red light includes a red color filter in front of the light receiving surface and receives red light that has passed through the color filter. The red color filter passes light in a red wavelength band and absorbs or reflects light in other wavelength bands. Similarly, the pixel array 415G includes a green color filter and receives light in a green waveband, and the pixel array 415B includes a blue color filter and receives light in a blue waveband.

A charge coupled device (CCD) or a complementary metal-oxide-semiconductor (CMOS) may be used for the pixel array. The pixel array 415 may be formed using a CCD or CMOS area sensor having a two-dimensional pixel array. In order to increase the light collection efficiency of the pixel array 415, a rod lens array can be provided for guiding the light reflected by the print medium P to the pixel array 415.

The reading device 410 receives reflected light from the print medium P, which is a reading target, and outputs an image signal. Specifically, the reading device 410 can output the image signal including the edge (end portion) of the print medium P sent from the image forming apparatus 3 and an image formed on the print medium P.

The background unit 420 includes a background member that contacts the other surface side (the negative Z-direction side in FIG. 5) of the print medium P. The background member serves as a background of the print medium P when the reading device 410 reads the edge of the print medium P. The "other surface" is a surface opposite to the surface of the print medium P facing an area in which the reading device 410 is disposed.

More specifically, the background unit 420 includes a revolver 421, a white small-diameter roller 422, a black small-diameter roller 423, a white large-diameter roller 424, and a black large-diameter roller 425. As illustrated in FIG. 5, the white small-diameter roller 422, the white large-diameter roller 424, the black small-diameter roller 423, and the black large-diameter roller 425 are disposed in the revolver 421 such that the white small-diameter roller 422, the white large-diameter roller 424, the black small-diameter roller 423, and the black large-diameter roller 425 are arranged around a cylindrical axis of a cylindrical member included in the revolver 421. In the present embodiment, each of the white small-diameter roller 422, the white large-diameter roller 424, the black small-diameter roller 423, and the black large-diameter roller 425 serves as a background member and serves as a cylindrical member.

The cylindrical member included in the revolver 421 is formed with multiple circular through holes penetrating in the cylindrical axis direction. The through holes are formed such that the through holes are disposed around the cylindrical axis of the revolver 421. Each roller is passed through the through hole to attach each roller to the revolver 421.

The circular through hole may not have a circular cross-sectional shape and may have a cross-sectional shape that is a part of a circle. For example, when a prismatic member is disposed in place of the roller, a rectangular through hole may be formed.

The revolver 421 is rotatable about a cylindrical axis of the revolver 421 (in the direction indicated by the arrow "u" in FIG. 5). For example, a control signal may rotationally drive the motor attached to the revolver 421 to rotate the revolver 421 in the direction indicated by arrow "u." By so doing, a predetermined roller among the multiple rollers disposed in the revolver 421 contacts the other surface of the print medium P. However, in the present embodiment, the revolver 421 is not limited to rotating in accordance with the control signal, and an operator of the image forming system 2 may manually rotate the revolver 421 to bring the predetermined roller of the multiple disposed rollers into contact with the other surface of the print medium P.

As a result, the white small-diameter roller 422, the white large-diameter roller 424, the black small-diameter roller 423, and the black large-diameter roller 425 are disposed such that the white small-diameter roller 422, the white large-diameter roller 424, the black small-diameter roller 423, and the black large-diameter roller 425 can contact the other surface of the print medium P by the rotation of the revolver 421.

The white small-diameter roller 422 and the black small-diameter roller 423 have the same roller diameter but have different roller colors. For example, when the base color of the print medium P is white and the black small-diameter roller 423 contacts the other surface of the print medium P, the color contrast between the print medium P and the black small-diameter roller 423 as the background member becomes high. Accordingly, the edge position of the print medium P can be more easily detected. Although the white small-diameter roller 422 and the black small-diameter roller 223 are described in the above description, the same applies to the white large-diameter roller 424 and the black large-diameter roller 425. Although the black and white rollers are used as an example in the above description, the present embodiment is not limited thereto, and rollers of other colors may be used according to the color of the print medium P.

On the other hand, the black small-diameter roller 423 and the black large-diameter roller 425 have the same roller color but different roller diameters. When the black large-diameter roller 425 contacts the other surface of the print medium P, the black large-diameter roller 425 pushes the print medium P in the positive Z-direction in FIG. 5. Accordingly, the height in the direction (Z-direction in FIG. 5) intersecting the surface of the print medium P can be made different from that when the black small-diameter roller 423 contacts the other surface of the print medium P. In other words, as compared with the case where the black small-diameter roller 423 contacts the other surface of the print medium P, the one surface of the print medium P can be brought closer to the reading device 410 when the black large-diameter roller 425 contacts the other surface of the print medium P.

Since the print medium P may have a different thickness depending on the type of the print medium P, the distance (height) from one surface of the print medium P to the reading device 410 is different between a thin print medium P and a thick print medium P. Due to such a difference in height, an image read by the reading device 410 may include an out-of-focus.

In particular, since the reading device 410 is configured to be thin, the depth of field is shallow. As a result, the read image is likely to be out-of-focus due to a slight difference in height from the one surface of the print medium P to the reading device 410 caused by a difference in thickness of the print medium P. When the out-of-focus image is used, it is difficult to accurately detect the edge position of the print medium P and the edge position of the image formed on the print medium P.

In the present embodiment, for example, when the print medium P is thin, the black large-diameter roller 425 can contact the other surface of the print medium P to bring one surface of the print medium P close to the reading device 410. On the other hand, when the print medium P is thick, the black small-diameter roller 423 contacts the other surface of the print medium P such that the one surface of the print medium P can be prevented from approaching the reading device 410.

In this way, since the height from the one surface of the print medium P to the reading device 410 can be made constant regardless of the thickness of the print medium P, the image inspection apparatus 4 can prevent out-of-focus in the read image. Although the black small-diameter roller 423 and the black large-diameter roller 425 were described above as an example, the same applies to the white small-diameter roller 422 and the white large-diameter roller 424.

In the example described above, the roller is used as the background member, and the "height" is made different by changing the diameter of the roller, but the present embodiment is not limited to this. For example, when the image inspection apparatus 4 uses a prism as the background member and changes the height (thickness) dimension in the cross-sectional shape of the prism, the "height" can be changed.

Although the internal configuration of the image inspection apparatus 4 has been described above, the image inspection apparatus 4 is not limited to the above-described internal configuration. For example, the image inspection apparatus 4 may have an internal configuration that does not have the structure of the revolver 421.

Figure 6:
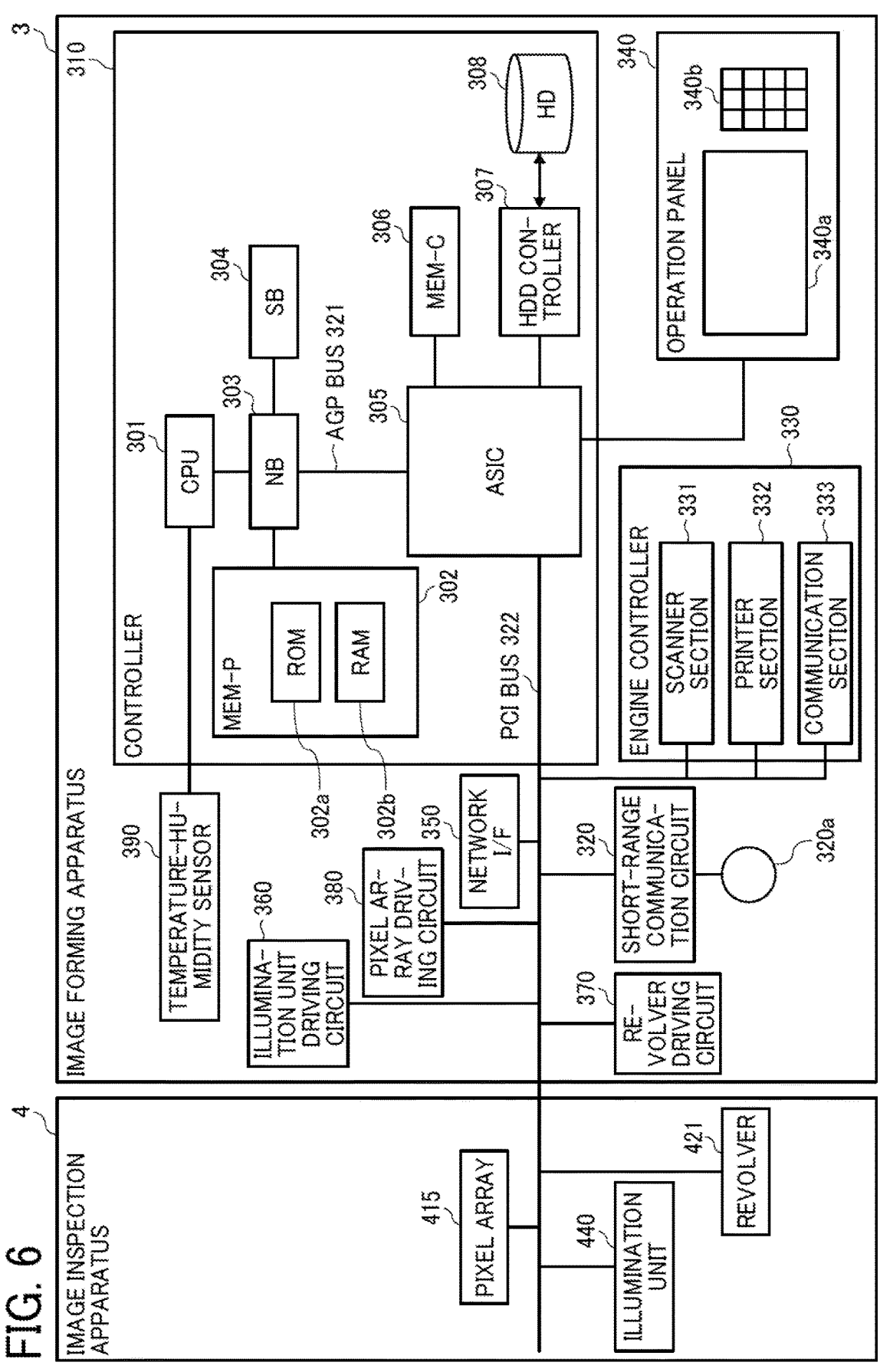
FIG. 6 is a diagram illustrating a hardware configuration of an image forming apparatus and the image inspection apparatus according to an embodiment of the present disclosure.
Figure 7:
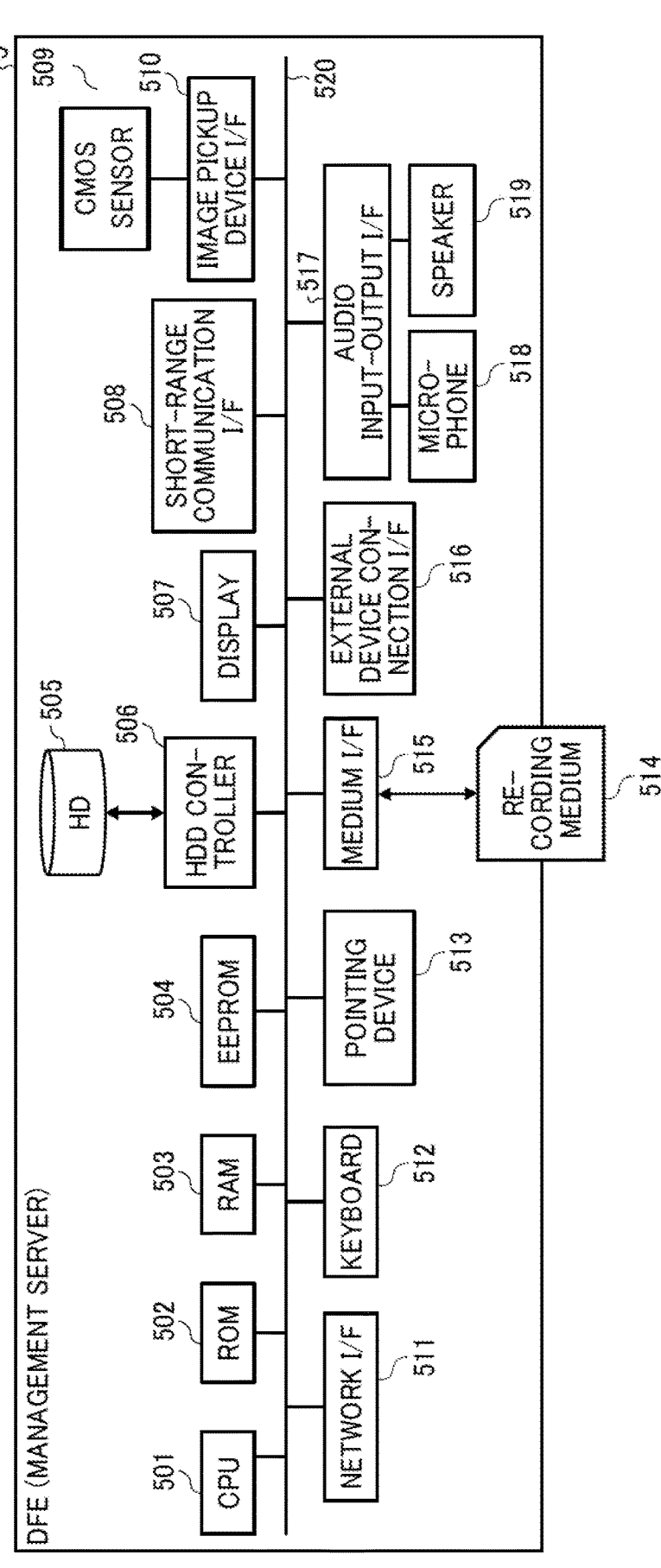
FIG. 7 is a diagram illustrating a hardware configuration of a digital front end (DFE) that serves as a management server according to an embodiment of the present disclosure.

With reference to FIGS. 6 and 7, a description is given of hardware configurations of a communication terminal, or an apparatus included in the image inspection system 1 according to the present embodiment. Certain hardware elements of the apparatus and the communication terminal may be added to or deleted from the hardware configurations illustrated in FIGS. 6 and 7 as appropriate.

FIG. 6 is a diagram illustrating the hardware configuration of the image forming apparatus 3 and the image inspection apparatus 4 according to an embodiment of the present disclosure.

As illustrated in FIG. 6, the image forming apparatus 3 is, for example, an MFP, and includes hardware resources including a controller 310, a short-range communication circuit 320, an engine controller 330, the operation panel

340, a network interface (I/F) 350, an illumination unit driving circuit 360, a revolver driving circuit 370, a pixel array driving circuit 380, and a temperature-humidity sensor 390.

The controller 310 includes a central processing unit (CPU) 301 as a main processor, a system memory (MEM-P) 302, a north bridge (NB) 303, a south bridge (SB) 304, an application specific integrated circuit (ASIC) 305, a local memory (MEM-C) 306 as a storage unit, a hard disk drive (HDD) controller 307, and a hard disk (HD) 308 as a storage unit. The NB 303 and the ASIC 305 are connected through an accelerated graphics port (AGP) bus 321.

The CPU 301 controls the entire operation of the image forming apparatus 3. The NB 303 connects the CPU 301 with the MEM-P 302, the SB 304, and the AGP bus 321. The NB 303 includes a memory controller for controlling the reading or writing of various data with respect to the MEM-P 302, a Peripheral Component Interconnect (PCI) master, and an AGP target.

The MEM-P 302 includes a read-only memory (ROM) 302*a* as a memory that stores program and data for implementing various functions of the controller 310. The MEM-P 302 further includes a random access memory (RAM) 302*b* as a memory that loads the program and data, or as a drawing memory that stores drawing data for printing. The program stored in the RAM 302*b* may be provided as a file in a format installable or executable by a computer, stored on a computer-readable recording medium such as a compact disc read-only memory (CD-ROM), compact disc-recordable (CD-R), or digital versatile disk (DVD).

The SB 304 connects the NB 303 with a PCI device or a peripheral device. The ASIC 305 is an integrated circuit (IC) dedicated to image processing use and includes a hardware element for image processing. The ASIC 305 is a bridge that connects the AGP bus 321, a PCI bus 322, the HD 308, and the MEM-C 306 with each other. The ASIC 305 includes a PCI target, an AGP master, an arbiter, a memory controller to control the MEM-C 306, multiple direct memory access controllers (DMACs), and a PCI unit. The arbiter arbitrates a drive timing of individual signals according to a fixed priority in the ASIC 305. The DMACs rotate image data by converting coordinates of the image data with, for example, hardware logic. The PCI unit transfers data between a scanner section 331 and a printer section 332 via the PCI bus 322. The ASIC 305 may connect to the universal serial bus (USB) interface, the institute of electrical and electronics engineers 1394 (IEEE1394) interface, or both.

The MEM-C 306 is a local memory used as a buffer for image data to be copied or a code buffer. The HD 308 stores various image data, font data for printing, and form data. The HDD controller 307 controls to read or write data to the HD 308 under the control of the CPU 301. The AGP bus 321 is a bus interface for a graphics accelerator card, which has been proposed to accelerate graphics processing. Through directly accessing the MEM-P 302 by high throughput, the speed of the graphics accelerator card can be increased.

The short-range communication circuit 320 is provided with a short-range communication antenna 320*a*. The short-range communication circuit 320 is a communication circuit that communicates in compliance with near field communication (NFC) or the Bluetooth®, for example.

The engine controller 330 includes the scanner section 331, the printer section 332, and a communication section 333. The operation panel 340 includes a panel display 340*a* and an operation keyboard 340*b*. The panel display 340*a* is implemented by, for example, a touch panel that displays current settings or a selection screen and receives the user input. The operation keyboard 340*b* includes a numeric keypad that receives set values of various image forming parameters such as image density parameter and a start key that accepts an instruction for starting to copy. The panel display 340*a* serves as a display or a display device according to the present embodiment. The controller 310 controls the entire operation of the image forming apparatus 3. For example, the controller 310 controls drawing, communication, and input from the operation panel 340. The scanner section 331 and the printer section 332 have capabilities of image processing such as error diffusion and gamma (γ) conversion. The communication section 333 includes a speaker, a modem and an analog I/F for performing facsimile communication, via an analog line (public line), with an external apparatus having a facsimile communication function.

In response to an instruction to select a specific application through the operation panel 340 by use of, e.g., an application (or mode) switch key, the image forming apparatus 3 selectively performs a document server function, a copier function, a printer function, and a facsimile function. In response to the selection of the document box function, the image forming apparatus 3 operates in a document box mode. In response to the selection of the copier function, the image forming apparatus 3 operates in a copier mode. In response to the selection of the printer function, the image forming apparatus 3 operates in printer mode. In response to the selection of the facsimile function, the image forming apparatus 3 operates in a facsimile mode.

The network I/F 350 is an interface for performing data communication using a wired cable or a communication network. The short-range communication circuit 320 and the network I/F 350 are electrically connected to the ASIC 305 through the PCI bus 322.

The illumination unit drive circuit 360 is a circuit to drive the illumination unit 440 described in the diagram of the internal configuration of the image inspection apparatus 4 in FIG. 5.

The revolver driving circuit 370 is a circuit to drive the revolver 421 described in the diagram of the internal configuration of the image inspection apparatus 4 in FIG. 5.

The pixel array driving circuit 380 is a circuit to drive the pixel array 415 described in the diagram of the internal configuration of the image inspection apparatus 4 in FIG. 5.

The temperature-humidity sensor 390 is a sensor to acquire temperature information and humidity information inside or around the image forming apparatus 3 or the image forming system 2, The temperature-humidity sensor 390 serves as a detector including a thermistor, a thermocouple, a resistance type humidity sensor, or a capacitive humidity sensor.

The illumination unit driving circuit 360, the revolver driving circuit 370, and the pixel array driving circuit 380 described above are respectively connected to the pixel array 415, the illumination unit 440, and the revolver 421 included in the image inspection apparatus 4 via the PCI bus 322 connected to the ASIC 305.

As described above, the image inspection apparatus 4 includes hardware resources including the pixel array 415, the illumination unit 440, and the revolver 421. Since these hardware resources are the same as the hardware resources described in the diagram of the internal configuration of the image inspection apparatus 4 in FIG. 5, the description herein is omitted.

In the present embodiment, the image inspection apparatus 4 shares a storage unit 3000 included in the image forming apparatus 3. Various kinds of processing information (data), control information (data) for controlling the hardware configuration in the image inspection apparatus 4, and image data are exchanged via the PCI bus 322.

The image inspection apparatus 4 may independently include various hardware resources included in the image forming apparatus 3 described above. In other words, when the image inspection apparatus 4 includes various hardware resources such as a CPU independently of the image forming apparatus 3, the image inspection apparatus 4 may transmit and receive information (data) alone related to processing in cooperation with the image forming device 3 without transmitting and receiving all data via the PCI bus 322, for example.

FIG. 7 is a diagram illustrating a hardware configuration of the DFE 5 that serves as a management server, according to an embodiment of the present disclosure.

As illustrated in FIG. 7, the DFE 5 is implemented by, for example, a computer and includes a CPU 501, a ROM 502, a RAM 503, an electrically erasable programmable read-only memory (EEPROM) 504, a HD 505, an HDD controller 506, a display 507, a short-range communication I/F 508, a CMOS sensor 509, and an image pickup device I/F 510. The DFE 5 further includes a network I/F 511, a keyboard 512, a pointing device 513, a medium I/F 515, an external device connection I/F 516, an audio input/output I/F 517, a microphone 518, a speaker 519, and a bus line 520.

The CPU 501 controls the entire operation of the DFE 5. The ROM 502 stores programs to boot the CPU 501. The RAM 503 is used as a work area for the CPU 501. The EEPROM 504 reads or writes various data such as an application under the control of the CPU 501. The display 507 displays various kinds of information such as a cursor, a menu, a window, characters, or an image. The display 507 serves as a display or a display device according to the present embodiment. The short-range communication I/F 508 is a communication circuit for performing data communication with communication devices or communication terminals including a wireless communication interface in compliance with the near field communication (NFC), the Bluetooth®, or the Wireless Fidelity® (WI-FI). The CMOS sensor 509 serves as a built-in imaging device for obtaining image data or video data by capturing a subject, under the control of the CPU 501. In alternative to a CMOS sensor, an imaging device may be a charge-coupled device (CCD) sensor. The image pickup device I/F 510 is a circuit that controls the driving of the CMOS sensor 509.

The network I/F 511 is an interface for performing data communication using a wired cable or a communication network. The keyboard 512 is an input device provided with multiple keys for the user to input, for example, characters, numerals, or various instructions. Instead of or in addition to the keyboard 512, the DFE 5 may include an input device implemented by a touch panel for inputting characters, numerals, or various instructions. The pointing device 513 serves as an input device that allows the user to select or execute a specific instruction, select a target for processing, or move a cursor being displayed. The medium I/F 515 reads or writes (stores) data from or to a recording medium 514 such as a flash memory. The external device connection I/F 516 is an interface for connection with various external devices. The external device in this case is, for example, a USB memory. The audio input/output I/F 517 is a circuit for controlling the input and output of sound signals between the microphone 518 and the speaker 519 under the control of the CPU 501. The microphone 518 is a built-in circuit that converts sound into electrical signals. The microphone 518 acquires sound and sound waves emitted from an external speaker and acquires information using electrical signals. The speaker 519 is a built-in circuit that converts electrical signals into physical vibration to generate sound such as music or speech (voice). The bus line 520 is, for example, an address bus and a data bus for electrically connecting the components such as the CPU 501.

The programs may be distributed as files in an installable or executable format stored in a computer-readable recording medium or downloaded via a network. Examples of the recording medium include a CD-R, a DVD, a Blu-ray® disc, a secure Digital® (SD) card, and a USB memory. Such recording medium may be provided in the form of a program product to the users within a certain country or outside that country. For example, the image inspection apparatus 4 executes a program according to an embodiment of the present disclosure to implement an image inspection method according to an embodiment of the present disclosure.

A description is given below of a functional configuration of the image inspection system 1 according to the present embodiment, with reference to FIG. 8 to FIG. 11.

Figure 8:
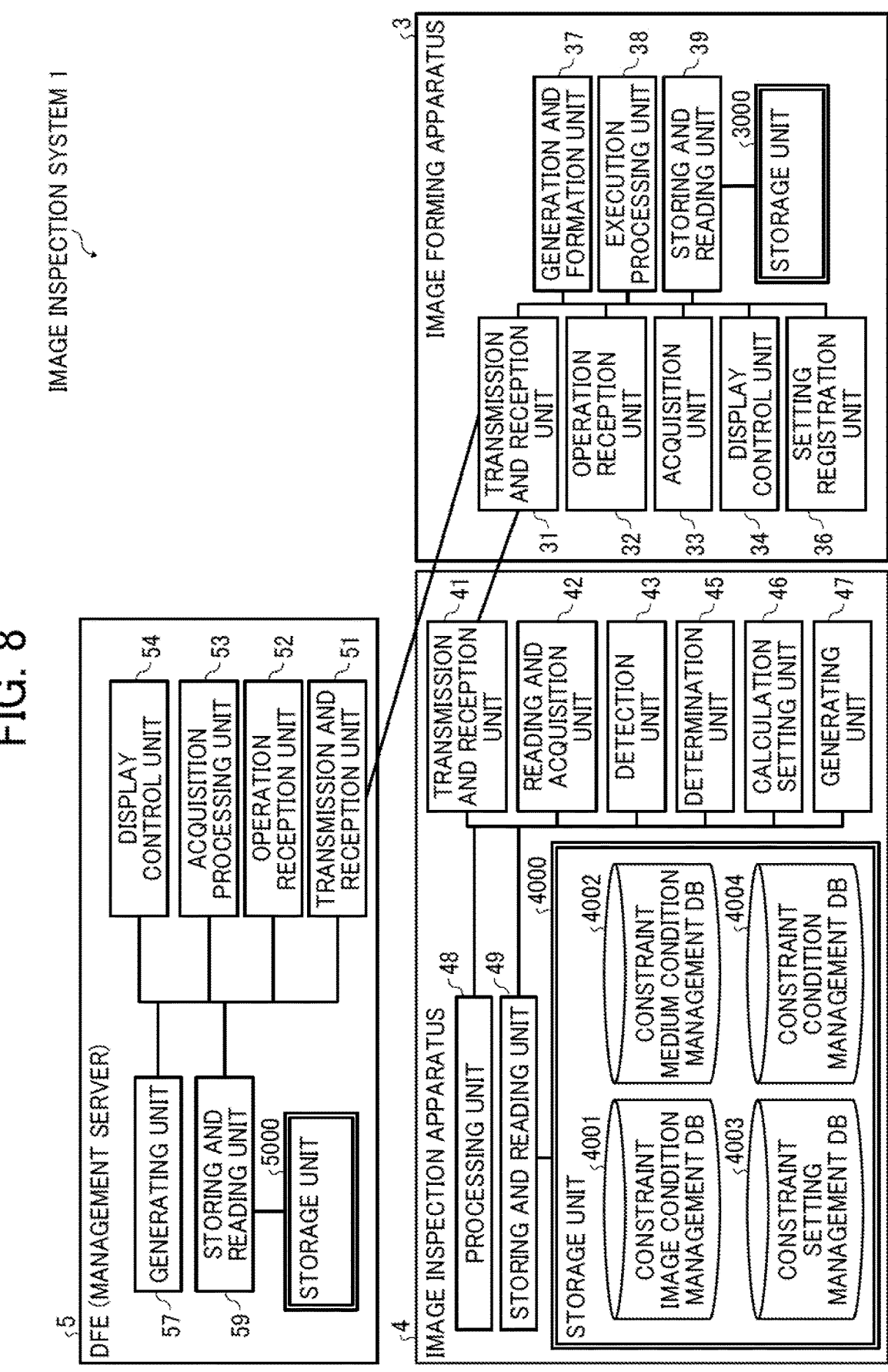
FIG. 8 is a diagram illustrating a functional configuration of the image inspection system according to an embodiment of the present disclosure.

FIG. 8 is a diagram illustrating the functional configuration of the image inspection system 1 according to an embodiment of the present disclosure.

FIG. 8 illustrates elements related to processing or operation to be described below, out of various apparatuses illustrated in FIG. 1.

Referring to FIG. 8, a description is given below of the functional configuration of the image forming apparatus 3.

As illustrated in FIG. 8, the image forming apparatus 3 includes a transmission and reception unit 31, an operation reception unit 32, an acquisition unit 33, a display control unit 34, a setting registration unit 36, a generation and formation unit 37, an execution processing unit 38, and a storing and reading unit 39.

Each of the functional units is implemented by one or more of the hardware resources illustrated in FIG. 6. The one or more of the hardware resources operate in response to an instruction from the CPU 301 according to a program for the image forming apparatus 3 loaded from at least one of the ROM 302a and the HD 308 into the RAM 302b. The image forming apparatus 3 further includes a storage unit 3000 that is implemented by at least one of the ROM 302a and the HD 308 illustrated in FIG. 6. The storage unit 3000 stores a communication program (communication application) and a browser application for performing communication with the DFE 5 via a wired cable or a communication network.

A description is given below of each functional unit of the image forming apparatus 3 in detail. The transmission and reception unit 31 of the image forming apparatus 3 illustrated in FIG. 8 is implemented by processing of the CPU 301 with respect to the network I/F 350. The transmission and reception unit 31 transmits and receives various data (or information) to and from the DFE 5 via the wired cable or the communication network. The transmission and reception unit 31 transmits and receives various data (or information) and image data to and from the image inspection apparatus 4 via the PCI bus 322. The transmission and reception unit 31 serves as at least one of the transmission unit and the reception unit according to the present embodiment.

The operation reception unit 32 is implemented by CPU 301 processing signals generated by various operations received by the panel display 340a of the operation panel 340. To be specific, the operation reception unit 32 receives various condition setting inputs by the user to the panel display 340a or the operation keyboard 340b of the operation panel 340. The operation reception unit 32 serves as a reception unit according to the present embodiment.

The acquisition unit 33 is implemented by the CPU 301 performing processing with respect to the scanner section 331. The acquisition unit 33 reads and acquires an image of a document set on the image forming apparatus 3. In addition, the acquisition unit 33 is implemented by the CPU 301 performing processing with respect to the temperature-humidity sensor 390. The acquisition unit 33 acquires the temperature information and the humidity information inside or around the image forming apparatus 3 or the image forming system 2. The acquisition unit 33 serves as an acquisition unit according to the present embodiment.

The display control unit 34 is implemented by the CPU 301 performing processing with respect to the operation panel 340. The display control unit 34 performs display control of various screens and information (data) in the image forming apparatus 3. In addition, the display control unit 34 displays a display screen generated by hypertext markup language (HTML) on the operation panel 340 using, for example, a browser. The display control unit 34 serves as a display controller according to the present embodiment.

The setting registration unit 36 is implemented by the processing of the CPU 301, and performs various settings related to the type of print medium. The setting registration unit 36 serves as a register according to the present embodiment.

The generation and formation unit 37 is implemented by the CPU 301 performing processing with respect to the printer section 332. The generation and formation unit 37 generates image data for printing to form an image on a print medium based on input image data that is input or a document that is read. The generation and formation unit 37 serves as a generation unit and a formation unit according to the present embodiment.

The execution processing unit 38 is implemented by the processing of the CPU 301 and performs execution of the generation processing, the formation processing, and various types of processing performed by the generation and formation unit 37. The execution processing unit 38 serves as a processor according to the present embodiment.

The storing and reading unit 39 is implemented by the CPU 301 performing processing with respect to the ROM 302a and the HD 308. The storing and reading unit 39 stores various data (or information) in the storage unit 3000 or reads various data (or information) from the storage unit 3000. The storing and reading unit 39 serves as a storer and a reader according to the present embodiment.

A description is given below of a functional configuration of the image inspection apparatus 4. As illustrated in FIG. 8, the image inspection apparatus 4 includes a transmission and reception unit 41, a reading and acquisition unit 42, a detection unit 43, a display control unit 44, a determination unit 45, a calculation setting unit 46, a generating unit 47, a processing unit 48, and a storing and reading unit 49. Each of the functional units provides a function that is implemented by any of the hardware resources illustrated in FIG. 6 operating in response to an instruction from the CPU 301 according to a program for the image inspection apparatus 4 loaded from at least one of the ROM 302a and the HD 308 of the image forming apparatus 3 into the RAM 302b. The image inspection apparatus 4 further includes a storage unit 4000 that is implemented by at least one of the ROM 302a and the HD 308 illustrated in FIG. 6. The storage unit 4000 may be, for example, a storage unit having a management area different from the management area of the storage unit 3000 described above. The storage unit 4000 may store a communication program (communication application) for communicating with the image forming apparatus 3 via the PCI bus 322, or a browser application. The storage unit 4000 may be provided with an execution area in which a communication protocol using the PCI bus 322 can be executed.

The image inspection apparatus 4 may further share the storage unit 3000 included in the image forming apparatus 3. In other words, the image inspection apparatus 4 may share a communication program (communication application), or a browser application stored in the storage unit 3000 included in the image forming apparatus 3. However, as described above in the hardware configuration, in a case where the image inspection apparatus 4 is configured to independently include a CPU or a ROM, the image inspection apparatus 4 is not limited to the configuration described above, and the image inspection apparatus 4 may independently include the storage unit 4000 as described above.

A description is given below of each functional unit of the image inspection apparatus in detail. The transmission and reception unit 41 of the image inspection apparatus 4 illustrated in FIG. 8 is implemented by the CPU 301 performing processing with respect to the network I/F 350 included in the image forming apparatus 3. The transmission and reception unit 41 transmits or receives various data (or information) to or from the image forming apparatus 3. The transmission and reception unit 31 transmits and receives various data (or information) and image data to and from the image inspection apparatus 4 via the PCI bus 322. The transmission and reception unit 41 serves as at least one of a transmitter and a receiver according to the present embodiment.

The reading and acquisition unit 42 is implemented by processing of the reading device 410 and the CPU 301 of the image forming apparatus 3. The reading and acquisition unit 42 acquires raster image processor (RIP) image data, print medium information, and environmental information including temperature information and humidity information transmitted by the image forming apparatus 3. The reading and acquisition unit 42 acquires an image formed on the print medium. Specifically, the reading and acquisition unit 42 reads an image on the print medium formed (printed) by the image forming apparatus 3 and acquires print image data. The reading and acquisition unit 42 further acquires, as abnormality detection conditions, input image information, print medium information, and the environmental information transmitted by the DFE 5 (management server) that manages the input image data. The reading and acquisition unit 42 serves as an acquisition unit according to the present embodiment.

The detection unit 43 is implemented by processing of a CPU 301 included in the image forming apparatus 3. The detection unit 43 detects whether an abnormality satisfying abnormality detection conditions has occurred in an acquired image. Specifically, the detection unit 43 detects an abnormality in the print image data (image data) indicating a print image acquired by the reading and acquisition unit 42. The detection unit 43 serves as a detection unit according to the present embodiment.

The determination unit 45 is implemented by processing of a CPU 301 included in the image forming apparatus 3. The determination unit 45 performs various determinations in the image inspection apparatus 4. The determining unit 45 serves as a determiner according to the present embodiment.

The calculation setting unit 46 is implemented by processing of the CPU 301 included in the image forming apparatus 3. The calculation setting unit 46 sets abnormality detection conditions to detect the abnormality occurring in an image formed on the print medium based on the input image data. The abnormality detection conditions set by the calculation setting unit 46 exclude specific conditions specified from at least one of the input image information related to the input image data and the print medium information related to the print medium. The calculation setting unit 46 sets the abnormality detection conditions excluding specific conditions according to the environmental information indicated by the temperature information related to the temperature around the print medium and the humidity information related to the humidity around the print medium. The calculation setting unit 46 sets the abnormality detection conditions excluding a specific condition related to a white void image in which an image of a predetermined distance is missing at a switching portion of a plate for each color forming an image and an abnormal image occurring at a predetermined distance from the rear end of the print medium with respect to the conveyance direction of the print medium. The calculation setting unit 46 sets the abnormality detection conditions according to the number of line information, density information, color information, and halftone mode information of an image included in the input image information. The calculation setting unit 46 sets the abnormality detection conditions according to the type of information related to the type of print medium and the characteristic information related to the characteristic of the print medium included in the print medium information. The calculation setting unit 46 calculates a region (coordinates in an image) that is not an abnormality detection target and sets the region in an item managed in a constraint setting management table to be described later. The calculation setting unit 46 sets values to various data tables managed by the image inspection apparatus 4. The calculation setting unit 46 serves as a determiner according to the present embodiment.

The generating unit 47 is implemented by the processing of the CPU 301 of the image forming apparatus 3. When an abnormal image is detected, the generating unit 47 generates notification data to be notified to the image forming apparatus 3.

The generating unit 47 serves as a generator according to the present embodiment.

The processing unit 48 is implemented by processing of the CPU 301 included in the image forming apparatus 3. The processing unit 48 executes various types of processing in the image inspection apparatus 4. The processing unit 48 serves as a processor according to the present embodiment.

The storing and reading unit 49 is implemented by the CPU 301, included in the image forming apparatus 3, performing processing with respect to the ROM 302a and the HD 308. The storing and reading unit 49 stores or reads various data (or information) in or from the storage unit 3000. The storing and reading unit 49 serves as a storer and a reader according to the present embodiment.

FIG. 9 is a conceptual diagram illustrating a constraint image condition management table according to an embodiment of the present disclosure.

Note that the configuration of the data table described below is given as an example, and the configurations of the data tables according to the embodiments are not limited thereto. The storage unit 4000 includes a constraint image condition management database (DB) 4001 configured by the constraint image condition management table as illustrated in FIG. 9. In the constraint image condition management table, items of an image condition, an environmental condition, and a region to be excluded from the abnormality detection target are stored and managed in association with each other for each constraint condition identification information.

Among them, the constraint condition identification information is identification information for identifying a constraint condition that can be obtained based on the image condition and the environmental condition to be described later. As described with reference to FIG. 2, the image condition is represented by the type of the input image data, for example, a high-density half tone (HT) image, a low-density half tone (HT) image, a two-color (2C) image, or a halftone image having a predetermined number of screen lines. The image condition is represented by, for example, X, Y, and Z. The environmental condition represents temperature information and humidity information inside or around the image forming apparatus 3 or the image forming system 2. As for the environmental condition, both temperature and humidity are given positive and negative constant values with respect to a certain value, and conditions falling within these constant values are indicated by, for example, A, B, and C. When an abnormality occurring in the image formed on the print medium is handled as a constraint condition, the region excluded from the abnormality detection target indicates a predetermined region around a place where the abnormality occurs (abnormality occurrence place). The value managed in the item of the region excluded from the abnormality detection target may be a value calculated in advance by the image inspection apparatus 4 from the data of the occurrence region of the abnormal image occurring in the past under the corresponding image condition and environmental condition or may be a value input by the user from the outside. Depending on a combination of the image condition and the environmental condition, the region excluded from the abnormality detection target may be managed as "not applicable (none)". In the constraint image condition management table, a region that is not an abnormality detection target can be changed to an abnormal image detection target as a region that is an abnormality detection target.

The constraint image condition management table (constraint image condition management DB 4001) serves as a constraint image condition management unit according to the present embodiment.

FIG. 10 is a conceptual diagram illustrating a constraint medium condition management table according to an embodiment of the present disclosure.

Note that the configuration of the data table described below is given as an example, and the configurations of the data tables according to the embodiments are not limited thereto. The storage unit 4000 includes a constraint medium condition management DB 4002 configured by the constraint medium condition management table as illustrated in FIG. 10. In the constraint medium condition management table, items of a medium condition, an environmental condition, and a region to be excluded from the abnormality detection target are stored and managed in association with each other for each constraint condition identification information.

Among them, the medium condition is represented by the type of the print medium as described in FIG. 3. When the type of the print medium is a print sheet, the medium condition includes plain paper, thick paper, and thick coated paper. The medium condition is indicated by, for example, A, B, and C. When an abnormality occurring in the image formed on the print medium is handled as a constraint condition, the region excluded from the abnormality detection target indicates a predetermined region around a place where the abnormality occurs. The value managed in the item of the region excluded from the abnormality detection target may be a value calculated in advance by the image inspection apparatus 4 from the data of the occurrence region of the abnormal image occurring in the past under the corresponding medium condition and environmental condition or may be a value input by the user from the outside. The region excluded from the abnormality detection target is similar to the item having the same name described in the constraint image condition management table, but is different in that the abnormality that occurs depends on the type (medium condition) of the print medium. As a result, although the value of the region excluded from the abnormality detection target is also different from that in the case of FIG. 9, the region may be managed as "not applicable (none)" depending on the combination of the medium condition and the environmental condition, as in the case of FIG. 9. In the case illustrated in FIG. 10, the region excluded from the abnormality detection target is indicated by, for example, a predetermined distance from the rear end of the print medium. In the constraint image condition management table, a region that is not an abnormality detection target can be changed to an abnormal image detection target as a region that is an abnormality detection target.

The constraint medium condition management table (constraint medium condition management DB 4002) serves as a constraint medium condition management unit according to the present embodiment.

FIG. 11 is a conceptual diagram illustrating the constraint setting management table according to an embodiment of the present disclosure.

Note that the configuration of the data table described below is given as an example, and the configurations of the data tables according to the embodiments are not limited thereto. The storage unit 4000 includes a constraint setting management DB 4003 configured by the constraint setting management table as illustrated in FIG. 11. In the constraint setting management table, a region to be excluded from the abnormality detection target is stored and managed in association with each constraint condition identification information.

The region (coordinates in the image) excluded from the abnormality detection target is obtained by giving a position where an abnormality (a state of not being detected as "abnormality") deemed as a constraint occurs as an X-Y coordinate value based on the resolution and the size of the predetermined print medium, and the X-Y coordinate value is managed in units of, for example, dots or pixels. In other words, in the constraint setting management table, the coordinate values corresponding to the regions that are not an abnormality detection target managed in the constraint image condition management table and the constraint medium condition management table are managed. As a result, the region to be excluded from the abnormality detection target managed by the constraint condition identification information "I20003" is managed by, for example, the X-axis value of 1 to 9566 (dots or pixels) and the Y-axis value of 7016 to 9921 (dots or pixels).

The constraint setting management table (constraint setting management DB 4003) serves as a constraint setting management unit according to the present embodiment.

In the present embodiment, the data tables of FIGS. 9 to 11 described above are used to determine whether a state including a defect or a stain in an image formed on the print medium is detected as "abnormal" by comparison with a master image. In other words, when the occurrence condition of a defect or a stain in the image formed on the print medium is limited, the data tables of FIGS. 9 to 11 function as data for managing a condition for allowing the product as a "constraint" and allowing the user to use the product.

Returning to FIG. 8, a description is given below of the functional configuration of the DFE 5. As illustrated in FIG. 8, the DFE 5 includes a transmission and reception unit 51, an operation reception unit 52, an acquisition processing unit 53, a display control unit 54, a generating unit 57, and a storing and reading unit 59. Each of the functional units provides a function that is implemented by any of the hardware resources illustrated in FIG. 7 operating in response to an instruction from the CPU 501 according to a program for the DFE 5 loaded from at least one of the ROM 502, the EEPROM 504, the HD 505 and the recording medium 514 of the DFE 5 into the RAM 503. The DFE 5 further includes a storage unit 5000 that is implemented by at least one of the ROM 502, the EEPROM 504, HD 505, and the recording medium 514 illustrated in FIG. 7. The storage unit 5000 stores a communication program (communication application) for communicating with the image forming apparatus 3, and a browser application.

A detailed description is given below of each functional unit of the DFE 5. The transmission and reception unit 51 of the DFE 5 illustrated in FIG. 8 is implemented by the CPU 501 performing processing with respect to the network I/F 511 and short-range communication I/F 508. The transmission and reception unit 51 transmits and receives various types of information to and from the image forming apparatus 3 via a wired cable. The transmission and reception unit 51 transmits the input image information related to the input image and print medium type information indicating the type of the print medium to the image forming apparatus 3. The transmission and reception unit 51 serves as at least one of a transmitter and a receiver according to the present embodiment. The communication between the DFE 5 and the image forming apparatus 3 may be wireless communication via a predetermined wireless communication network.

The operation reception unit 52 is implemented by the CPU 501 performing processing with respect to signals generated by various operations received by at least one of the keyboard 512 and the pointing device 513. Specifically, the operation reception unit 52 receives various condition setting inputs by the user to at least one of the keyboard 512 and the pointing device 513. The operation reception unit 52 receives an input of at least one of the input image information and the print medium information configuring the abnormality detection conditions. Instead of or in addition to the keyboard 512 and the pointing device 513, the operation reception unit 52 may use signals generated by various operations received by an input unit such as a touch panel. The operation reception unit 52 serves as a receiver according to the present embodiment.

The acquisition processing unit 53 is implemented by the processing of the CPU 501. The acquisition processing unit 53 acquires the setting request transmitted by the image forming apparatus 3. The acquisition processing unit 53 serves as an acquirer according to the present embodiment.

The display control unit 54 is implemented by the CPU 501 performing processing with respect to the display 507. The display control unit 54 controls displaying various screens and information (data) on the DFE 5. The display control unit 54 may cause the display 507 to display a display screen generated by HTML using, for example, a browser. The display control unit 54 serves as a display controller according to the present embodiment.

The generating unit 57 is implemented by the processing of the CPU 501. The generating unit 57 generates job data to be executed by the image forming apparatus 3. The generating unit 57 serves as a generator according to the present embodiment.

The storing and reading unit 59 is implemented by the CPU 501 performing processing with respect to at least one of the ROM 502, the EEPROM 504, the HD 505, and the recording medium 514. The storing and reading unit 59 stores various data (or information) in the storage unit 5000 or reads various data (or information) from the storage unit 5000. The storing and reading unit 59 serves as a storer and a reader according to the present embodiment.

A description is given below of each process or operation in the image inspection system according to the first embodiment, with reference to FIGS. 12 to 17. Sequence diagrams and flowcharts described below are examples according to the present embodiment, and the sequence diagrams and flowcharts are not limited thereto.

A description is given below of a condition setting process.

Figure 12:
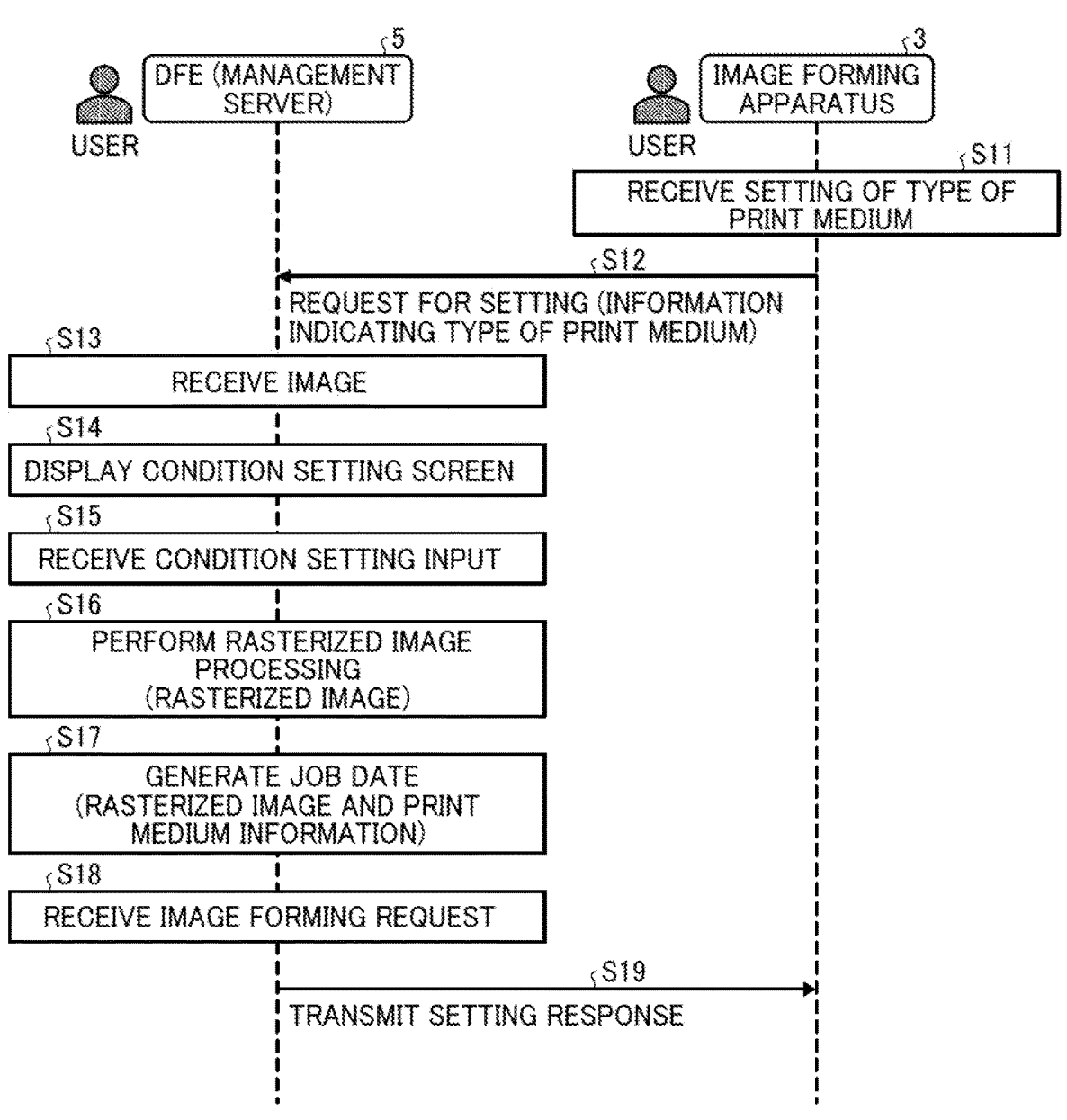
FIG. 12 is a sequence diagram illustrating a condition setting process according to an embodiment of the present disclosure.

FIG. 12 is a sequence diagram illustrating the condition setting process according to an embodiment of the present disclosure.

As illustrated in FIG. 12, the operation reception unit 32 of the image forming apparatus 3 receives the setting of the type of print medium (step S11). For example, when the print medium (paper) is set to the image forming apparatus 3, a paper brand identification reader, which is separately provided for the image forming apparatus 3, obtains information of the brand of the print medium. The information of the brand of the print medium is input to the panel display 340a or the operation keyboard 340b of the operation panel 340. Then, the operation reception unit 32 receives the information on the brand of the print medium. The operation reception unit 32 may receive information on the type of the print medium input by the user without using the paper brand identification reader.

Subsequently, the transmission and reception unit 31 transmits a setting request to the DFE 5 (management server) (step S12). Accordingly, the transmission and reception unit 51 of the DFE 5 receives the setting request transmitted by the image forming apparatus 3. The setting request includes the print medium type information. The setting request may further include the image data generated by the image forming apparatus 3.

Subsequently, the operation reception unit 52 of the DFE 5 receives image data (step S13). The image data may be generated by the DFE 5 or may be transmitted by the image forming apparatus 3 in step S12.

Subsequently, the display control unit 54 displays a condition setting screen on the display 507 (step S14).

Figure 13:
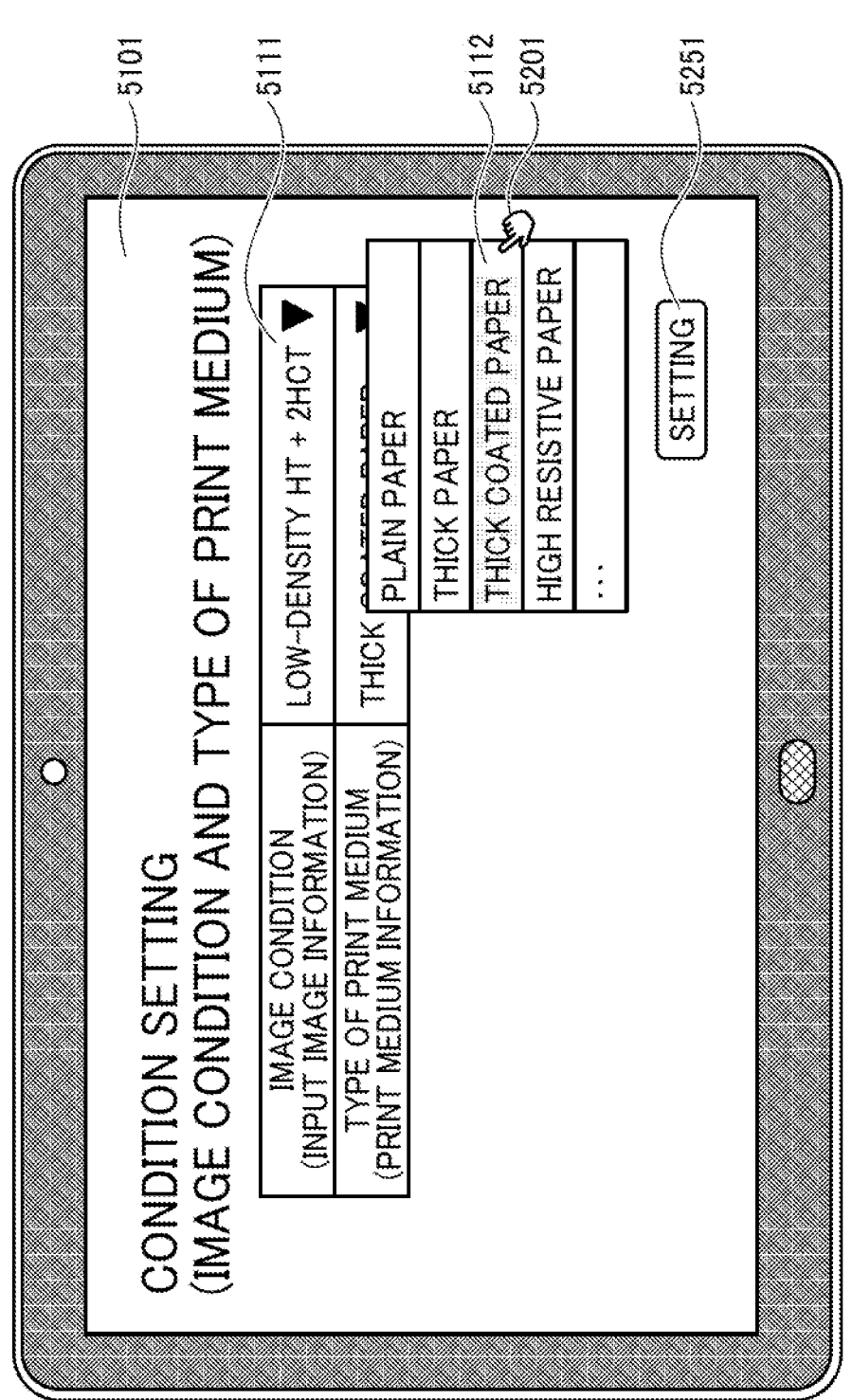
FIG. 13 is a diagram illustrating a display screen when various conditions are set in the management server according to an embodiment of the present disclosure.

FIG. 13 is a diagram illustrating a display screen when various conditions are set in the DFE 5 (management server), according to an embodiment of the present disclosure.

A condition setting screen 5101 is displayed on the display 507 of the DFE 5 (management server) by the display control unit 54. On the condition setting screen 5101, a condition input area 5111 is displayed. The condition input area 5111 includes an image condition input area dedicated to an image condition such as input image data and a print medium type input area dedicated to a print medium type. A pull-down key (button) is displayed in each input area in the condition input area 5111. The display control unit 54 can cause a pop-up window (dialog screen) 5112 including more specific information to be pop-up displayed near the condition input area 5111 by the user's operation using the cursor 5201 with respect to any one of the pull-down keys (buttons). When the user selects desired information and operates a setting button 5251 under the above conditions, the selected information can be set. In the example illustrated in FIG. 13, the user operates the pull-down keys (buttons) of the print medium information to display the pop-up window 5112, selects "thick coated paper" included in the pop-up window 5112 with the cursor 5201, and operates the setting button 5251.

As described above, the user can input the print condition of the input image on the print medium and an exclusion condition for excluding the abnormality to the condition setting screen 5101 displayed on the display screen of the DFE 5 and set the input contents that the user input.

Returning to FIG. 12, the operation reception unit 52 receives a condition setting input (step S15). In step S15, the DFE 5 receives input of various conditions according to the user's input to the condition setting screen 5101 in FIG. 13 described above.

Subsequently, the acquisition processing unit 53 performs rasterized image processing to generate a rasterized image (step S16). The rasterized image is an image that is converted into a form suitable for printing. Any known method may be used to generate and acquire rasterized image data by the rasterized image processing.

Subsequently, the generating unit 57 generates job data based on the rasterized image processed in step S16 (step S17). The job data includes the rasterized image data and the print medium information (information on the type of the print medium).

Subsequently, the operation reception unit 52 receives an image forming instruction (step S18).

Subsequently, the transmission and reception unit 51 transmits a setting response to the image forming apparatus 3 as a response to the setting request of step S12 (step S19). Accordingly, the transmission and reception unit 31 of the image forming apparatus 3 receives the setting response transmitted by the DFE 5. The setting response transmitted by the DFE 5 may include a message indicating a response to the setting request and flag information.

The sequence diagram illustrated in FIG. 12 is given as an example, and the above-described condition setting process is not limited thereto.

In the image inspection system according to the present embodiment, for example, when the processing of steps S12 and S19 described above is executed, another device may be present between the DFE 5 and the image forming apparatus 3. In other words, each piece of information (or data) may be exchanged between the DFE 5 and the image forming apparatus 3 via another device. The above-described configuration is applicable to a process that includes another processing step performed between the DFE 5 and the image forming apparatus 3.

A description is given below of an image inspection process.

Figure 14:
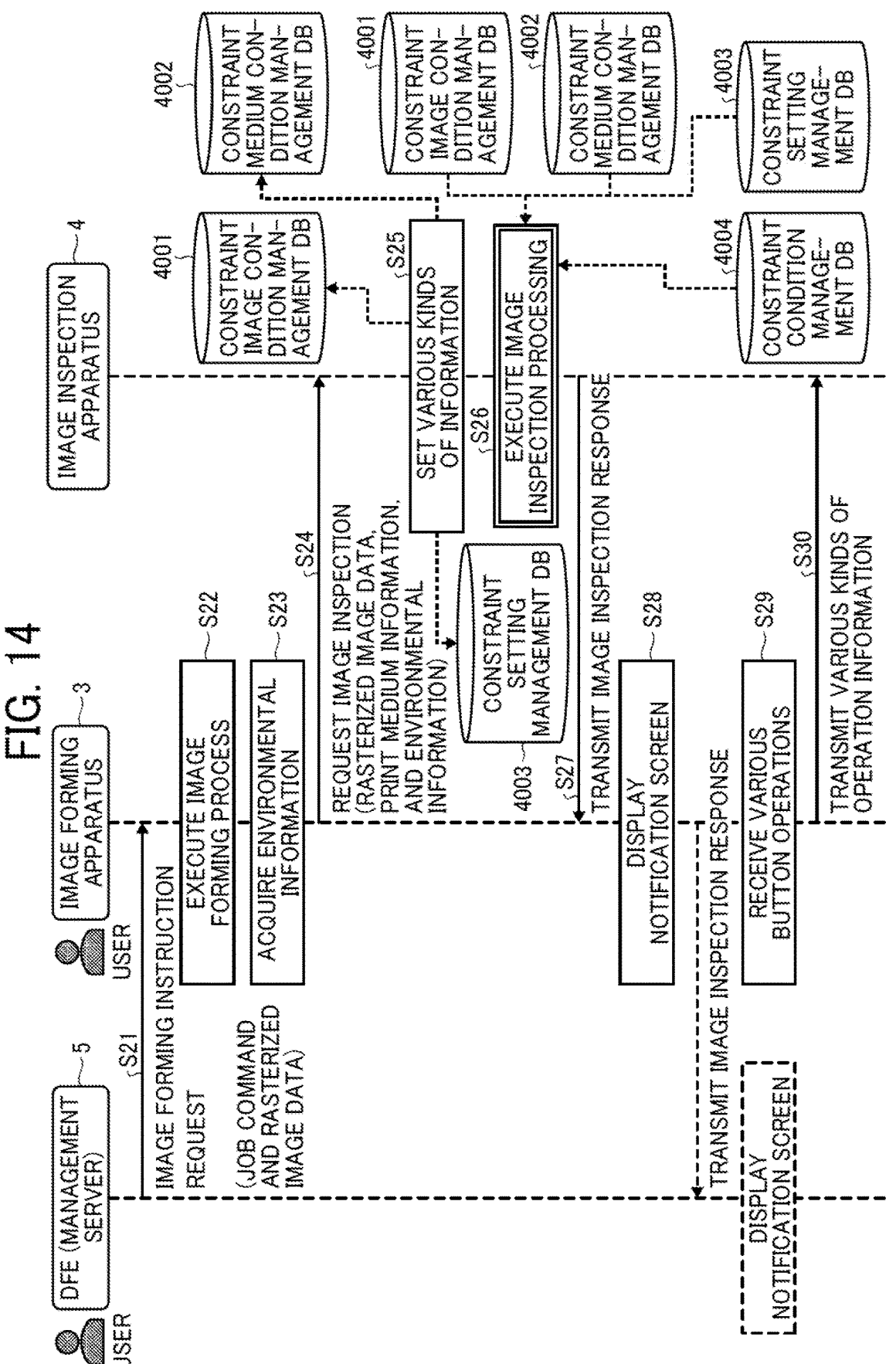
FIG. 14 is a sequence diagram illustrating an image inspection process in the image inspection system according to an embodiment of the present disclosure.

FIG. 14 is a sequence diagram illustrating the image inspection process in the image inspection system 1 according to an embodiment of the present disclosure.

As illustrated in FIG. 14, first, the transmission and reception unit 51 of the DFE 5 transmits an image forming instruction request to the image forming apparatus 3 (step S21). Accordingly, the transmission and reception unit 31 of the image forming apparatus 3 receives the image forming instruction request transmitted by the DFE 5. The image forming instruction request transmitted by the DFE 5 includes command data indicating a job command and the rasterized image data. The processing of step S21 may be executed in the processing of step S19 described above.

Subsequently, the execution processing unit 38 of the image forming apparatus 3 executes the image forming process together with the generation and formation unit 37 (step S22).

Subsequently, the acquisition unit 33 acquires the environmental information (step S23). Specifically, the acquisition unit 33 acquires temperature information and humidity information inside or around the image forming apparatus 3 or the image forming system 2 based on the output of the temperature-humidity sensor 390 provided for the image forming apparatus 3.

Subsequently, the transmission and reception unit 31 transmits an image inspection request to the image inspection apparatus 4 (step S24). Accordingly, the transmission and reception unit 41 of the image inspection apparatus 4 receives the image inspection request transmitted by the image forming apparatus 3. The image inspection request transmitted by the image forming apparatus 3 includes the rasterized image data processed based on the input image, the print medium information indicating information of the type of the print medium, and the environmental information including the temperature information and the humidity information.

Subsequently, the calculation setting unit 46 of the image inspection apparatus 4 sets various kinds of information (step S25).

The calculation setting unit 46 sets conditions specified from at least one of the input image information related to the input image data and the print medium information related to the print medium as the abnormality detection conditions to detect the abnormality occurring in the image formed on the print medium based on the input image data. To be more specific, the calculation setting unit 46 sets at least one of the image condition and the medium condition among the rasterized image data indicating the image condition, the type of the print medium indicating the medium condition, and the temperature information and the humidity information indicating the environmental condition received in step S24 to the corresponding item of the constraint image condition management DB 4001 (see FIG. 9) and the constraint medium condition management DB 4002 (see FIG. 10). The calculation setting unit 46 further calculates and sets the coordinates in the image as the region to be excluded from the abnormality detection target managed by the constraint setting management DB 4003 (see FIG. 11) based on the values set for the regions to be excluded from the abnormality detection target of the constraint image condition management DB 4001 and the constraint medium condition management DB 4002 described above. The coordinate values to be calculated and set are given in pixels or dots.

Subsequently, the image inspection apparatus 4 executes the image inspection process (step S26).

Figure 15:
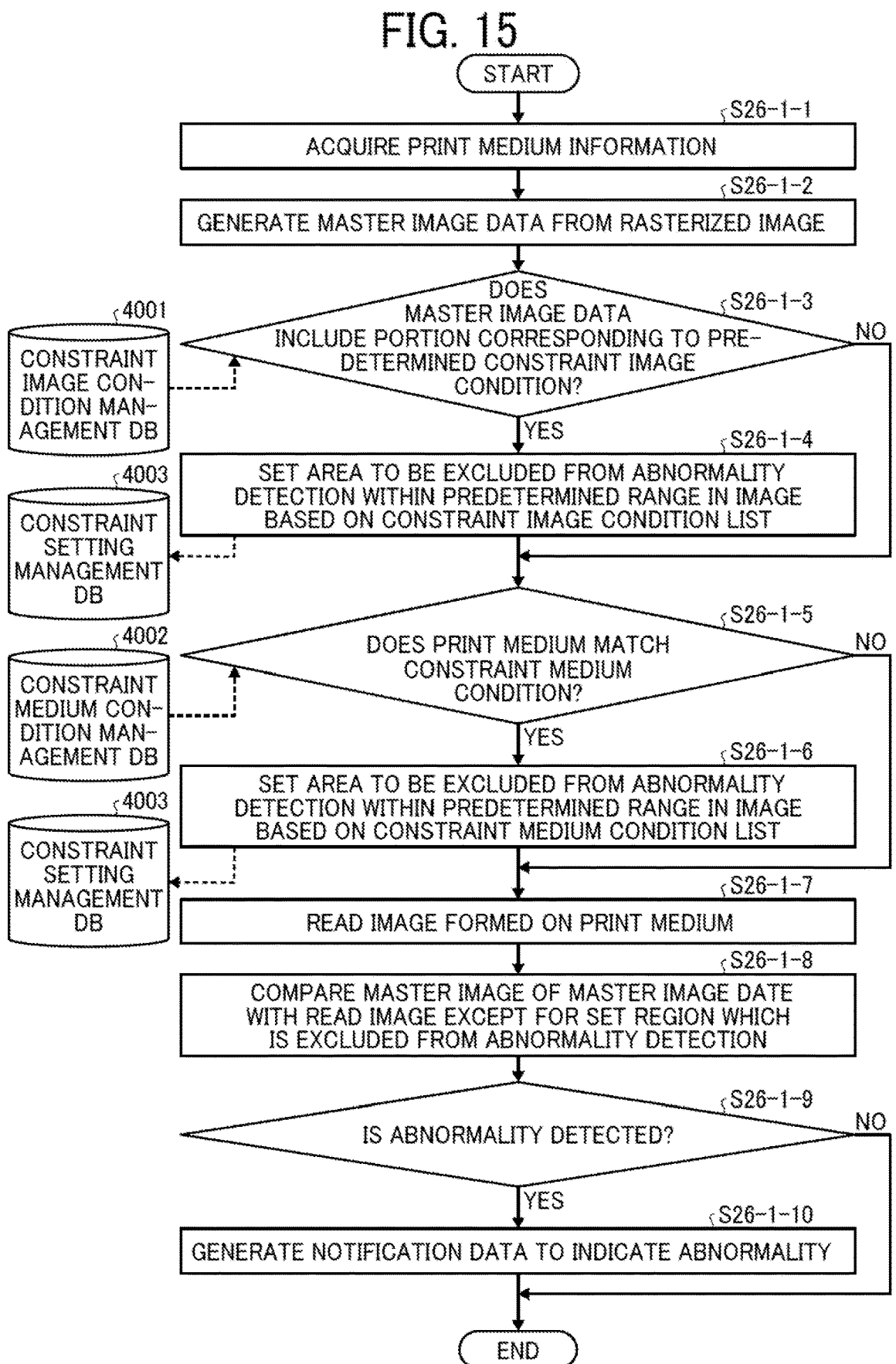
FIG. 15 is a flowchart of a detailed process of the image inspection process according to an embodiment of the present disclosure.

FIG. 15 is a flowchart of a detailed process of the image inspection process according to an embodiment of the present disclosure.

As illustrated in FIG. 15, the reading and acquisition unit 42 of the image inspection apparatus 4 acquires the print medium information (step S26-1-1). To be specific, the reading and acquisition unit 42 acquires the print medium information included in the image inspection request transmitted by the image forming apparatus 3 in step S24.

Subsequently, the generating unit 47 generates master image data from the rasterized image data (step S26-1-2). The master image data is, for example, reference image data that is obtained by recomposing a block copy (i.e., an original image or document) of the rasterized image data.

In the present embodiment, the master image data can be either image data generated based on input data received (acquired) from an external source or image data obtained by scanning a print image.

In the present embodiment, the image inspection apparatus 4 performs inspection of an abnormal image (defect) by comparing the reference image data with read image data indicating a read image obtained by scanning a printed image.

Subsequently, the determination unit 45 determines whether a portion corresponding to a predetermined constraint image condition in the master image data is present (step S26-1-3). Specifically, the determination unit 45 determines whether the master image data included in the master image matches the image condition indicated by the image condition of the constraint image condition management DB 4001 (see FIG. 9). For example, the determination unit 45 determines whether the master image data is configured with the high-density half tone (HT) image and the two-color (2C) image (image condition X).

When a portion corresponding to the predetermined constraint image condition in the master image data is present (YES in step S26-1-3), the calculation setting unit 46 sets a region to be excluded from the abnormality detection target in a predetermined range in the image based on a constraint image condition list (step S26-1-4). To be more specific, in step S26-1-3, the calculation setting unit 46 converts the region to be excluded from the abnormality detection target, corresponding to the predetermined image condition, into the coordinate values of the corresponding region in the master image data. Then, the calculation setting unit 46 registers (stores) the converted coordinate values, as coordinate values of the region to be excluded from the abnormality detection target, in the constraint setting management DB 4003 (see FIG. 11).

On the other hand, when a portion corresponding to the predetermined constraint image condition in the master image data is not present (NO in step S26-1-3), the image inspection apparatus 4 executes step S26-1-5 subsequently.

Subsequently, the determination unit 45 determines whether the print medium matches the constraint medium condition (step S26-1-5). Specifically, the determination unit 45 determines whether the print medium used for printing matches the medium condition indicated by the medium condition of the constraint medium condition management DB 4002 (see FIG. 10). For example, the determination unit 45 determines whether the print medium is thick coated paper.

When the print medium matches the constraint medium condition (YES in step S26-1-5), the calculation setting unit 46 sets a region to be excluded from the abnormality detection target in a predetermined range in the image based on the constraint medium condition list (step S26-1-6). To be more specific, in step S26-1-5, the calculation setting unit 46 converts the region to be excluded from the abnormality detection target, corresponding to the predetermined image condition, into the coordinate values of the corresponding region in the master image data. Then, the calculation setting unit 46 registers (stores) the converted coordinate values, as coordinate values of the region to be excluded from the abnormality detection target, in the constraint setting management DB 4003 (see FIG. 11).

On the other hand, when the print medium does not match the constraint medium condition (NO in step S26-1-5), the image inspection apparatus 4 executes step S26-1-7 subsequently.

The region to be excluded from the abnormality detection target is managed by both the constraint image condition management DB 4001 (see FIG. 9) and the constraint medium condition management DB 4002 (see FIG. 10). Accordingly, depending on the combination of the image condition and the medium condition, two different regions to be excluded from the abnormality detection target may be set. In this case, the image inspection apparatus 4 may employ an "or" condition (logical add condition) of the set regions to be excluded from the abnormality detection target in the setting of the regions to be excluded from the abnormality detection target illustrated in step S26-1-6 such that both regions to be excluded from the abnormality detection target are not regarded as abnormal images. On the other hand, the image inspection apparatus 4 may employ an "and" condition (logical product condition) of the set regions to be excluded from the abnormality detection target such that a common portion (common coordinate portion) of both regions to be excluded from the abnormality detection target is not regarded as an abnormal image.

Subsequently, the reading and acquisition unit 42 reads (acquires) the image formed on the print medium (step S26-1-7). Specifically, the reading and acquisition unit 42 drives the reading device 410 to read (acquire) the image formed on the print medium.

Subsequently, the processing unit 48 compares the master image related to the master image data with the read image except for the set region that is not the abnormality detection target (step S26-1-8). To be more specific, the processing unit 48 compares the master image related to the master image data with the read image except for the region that is not the abnormality detection target indicated by the predetermined range set in step S26-1-6 from the comparison target.

Subsequently, the determination unit 45 determines whether an abnormality is present based on a result of the comparison between the master image and the read image (step S26-1-9). Specifically, the determination unit 45 cooperates with the detection unit 43 to compare the master image with the read (acquired) image and detect whether an abnormality satisfying the abnormality detection conditions is present.

When the determination unit 45 determines that an abnormality is present based on a result of the comparison between the master image and the read image (YES in step S26-1-9), the generating unit 47 generates notification data indicating the abnormality and ends the process (step S26-1-10).

On the other hand, when the determination unit 45 determines that an abnormality is not present based on a result of the comparison between the master image and the read image (NO in step S26-1-9), the determination unit 45 ends the process.

The flowchart illustrated in FIG. 15 is given as an example, and the detailed processing related to the image inspection process described above is not limited thereto.

Returning to FIG. 14, the transmission and reception unit 41 transmits an image inspection response as a response to the image inspection request received in step S24 to the image forming apparatus 3 (step S27). Accordingly, the transmission and reception unit 31 of the image forming apparatus 3 receives the image inspection response transmitted by the image inspection apparatus 4. The image inspection response transmitted by the image inspection apparatus 4 includes notification data related to the image inspection result displayed by the image forming apparatus 3.

Figure 16:
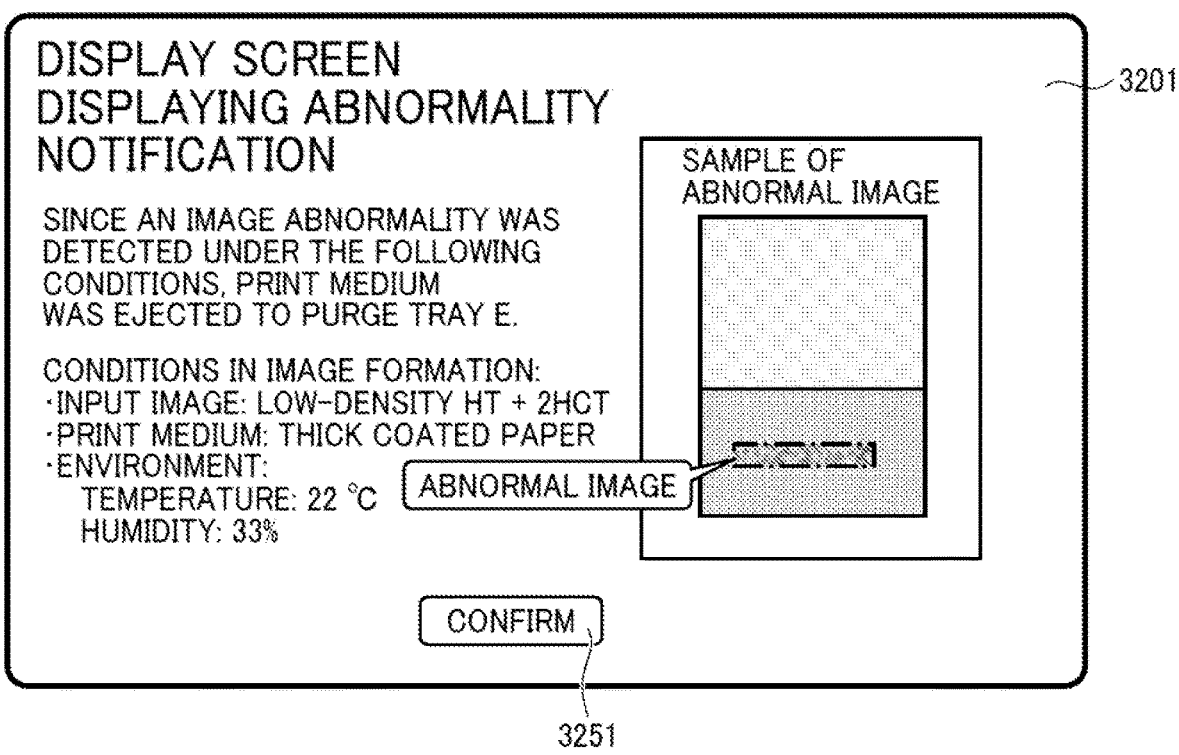
FIG. 16 is a diagram illustrating a display screen displaying an abnormality notification in the image forming apparatus according to an embodiment of the present disclosure.

Subsequently, the display control unit 34 of the image forming apparatus 3 displays a notification screen on the panel display 340a of the operation panel 340 (step S28). FIG. 16 is a diagram illustrating a display screen displaying an abnormality notification in the image forming apparatus 3 according to an embodiment of the present disclosure.

As illustrated in FIG. 16, the display control unit 34 displays an abnormality notification screen 3201 on the panel display 340a configuring the operation panel 340 of the image forming apparatus 3. On the abnormality notification screen 3201, information related to the input image, information related to the print medium, and environmental information including temperature information and humidity information are displayed as conditions at the time of image formation, together with a message indicating that an abnormality was detected in the image formed on the print medium and the print medium was ejected to a dedicated purge tray E. The display control unit 34 further displays, for example, a thumbnail image of the print medium including the abnormal image displayed as an abnormal image sample on the abnormality notification screen 3201. The user can confirm notification information in the abnormality notification screen 3201 and operate the confirmation button 3251 to shift to another screen.

Figure 17:
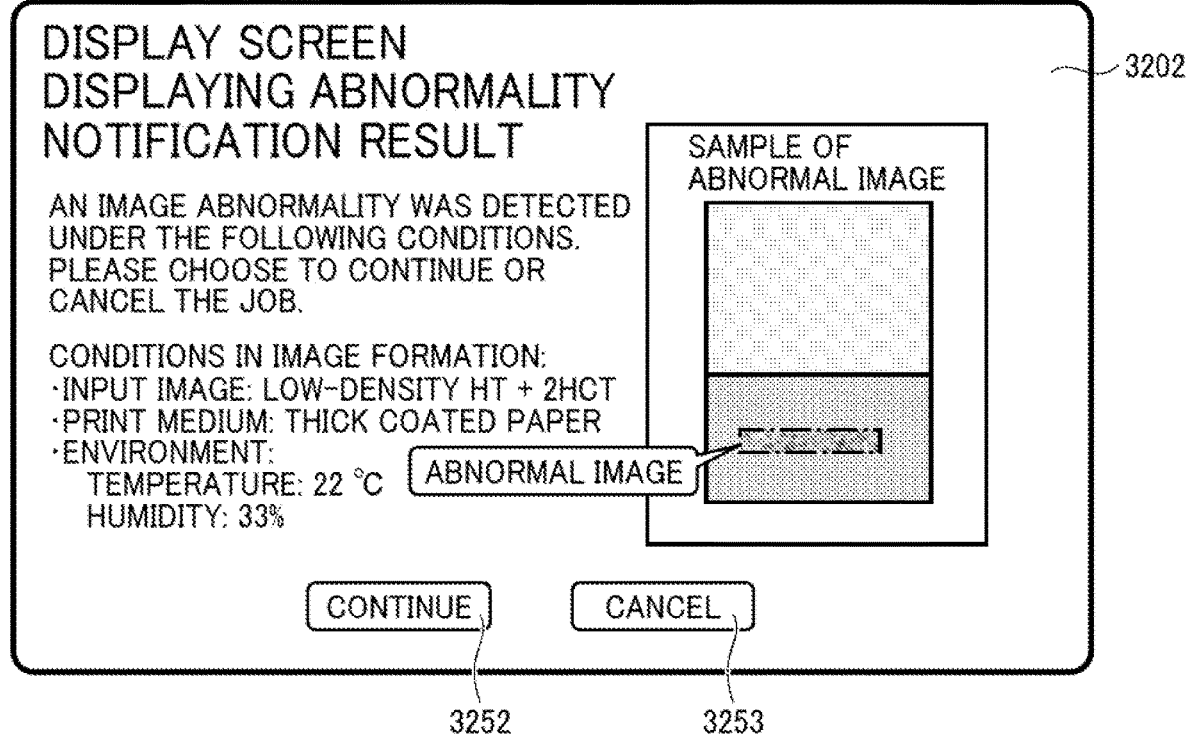
FIG. 17 is a diagram illustrating another display screen displaying an abnormality notification in the image forming apparatus according to an embodiment of the present disclosure.

FIG. 17 is a diagram illustrating another display screen displaying the abnormality notification in the image forming apparatus 3 according to an embodiment of the present disclosure.

As illustrated in FIG. 17, the display control unit 34 displays an abnormality notification screen 3202 on the panel display 340a configuring the operation panel 340 of the image forming apparatus 3. The contents displayed on the abnormality notification screen 3202 are the same as those displayed on the abnormality notification screen 3201 illustrated in FIG. 16 in that the conditions at the time of image formation and the abnormal image sample are displayed. On the other hand, the display control unit 34 displays a continue button 3252 for continuing the job and a stop button 3253 for stopping the job on the abnormality notification screen 3202. Accordingly, the user can select either the continue button 3252 or the stop button 3253 to continue or stop the subsequent execution of the job based on the displayed condition at the time of image formation.

Returning to FIG. 14, the operation reception unit 32 receives various button operations (step S29). Specifically, the operation reception unit 32 receives an operation on the confirmation button 3251 included in the abnormality notification screen 3201 illustrated in FIG. 16, or either the continue button 3252 or the stop button 3253 included in the abnormality notification screen 3202 illustrated in FIG. 17.

Subsequently, the transmission and reception unit 31 transmits various kinds of operation information to the image inspection apparatus 4 (step S30). Accordingly, the transmission and reception unit 41 of the image inspection apparatus 4 receives the various kinds of operation information transmitted by the image forming apparatus 3. The various kinds of operation information transmitted by the image forming apparatus 3 include button information of the confirmation button 3251 included in the abnormality notification screen 3201, or either the continue button 3252 or the stop button 3253 included in the abnormality notification screen 3202 illustrated in FIG. 17. In step S30, the image inspection apparatus 4 can execute subsequent processing according to the button information.

After step S28, the transmission and reception unit 31 may transmit (transfer) the image inspection response received in step S27 to the DFE 5. Accordingly, the transmission and reception unit 51 of the DFE 5 can receive the image inspection response transmitted by the image forming apparatus 3. In this case, the image inspection response includes the same notification data as that received in step S27. Accordingly, the display control unit 54 of the DFE 5 can display the notification screen configured by the notification data on the display 507.

The sequence diagram illustrated in FIG. 14 is given as an example, and the image inspection process described above is not limited thereto.

In the image inspection system 1 according to the present embodiment, for example, when the processing of the steps S24 and S27 described above are executed, another device may be present between the image forming apparatus 3 and the image inspection apparatus 4. In other words, each piece of information (or data) may be exchanged between the image forming apparatus 3 and the image inspection apparatus 4 via another device. The above-described configuration is applicable to a process that includes another processing step performed between the image forming apparatus 3 and the image inspection apparatus 4.

As described above, according to the present embodiment, the image inspection apparatus 4 sets at least one of the image condition and the medium condition among the rasterized image data indicating the image condition, the type of the print medium indicating the medium condition, and the temperature information and the humidity information indicating the environmental condition to the corresponding item of the constraint image condition management DB 4001 and the constraint medium condition management DB 4002 (step S25). Then, the image inspection apparatus 4 reads the image formed on the print medium (step S26-1-7), compares the master image with the read (acquired) image, and detects whether an abnormality satisfying the abnormality detection conditions is present (step S26-1-9). Accordingly, the image inspection apparatus 4 can easily distinguish between an abnormality that is not to be detected and an abnormality that is to be detected for an abnormality that occurs in an image formed on a print medium.

Second Embodiment

A description is given below of a second embodiment of the present disclosure. In the second embodiment, the determination processing (step S26-1-9) related to the abnormality detection described in the first embodiment is executed before the setting of the constraint image condition and the setting of the constraint medium condition. Accordingly, the system configuration of the image inspection system 1 according to the second embodiment and the hardware resources of each device configuring the image inspection system 1 are substantially the same as the hardware resources of each device according to the first embodiment. Accordingly, descriptions thereof are omitted. Since the functional configuration of various hardware resources is substantially the same as the functional configuration according to the first embodiment, descriptions thereof are omitted below. In the second embodiment, a constraint condition management table described below is newly used in the image inspection process described in the first embodiment.

FIG. 18 is a conceptual diagram illustrating a constraint condition management table according to the second embodiment of the present disclosure.

Note that the configuration of the data table described below is given as an example, and the configurations of the data tables according to the embodiments are not limited thereto. The storage unit 4000 includes a constraint condition management DB 4004 configured by the constraint condition management table as illustrated in FIG. 18. In the constraint condition management table, determination criteria and a precondition are stored and managed in association with each other for each classification. In the classification of the constraint condition management table in FIG. 18, items including the type of the print medium, the basis weight, a volume resistivity, the occurrence position of the abnormal image, and the environment are managed. The determination criteria represent a determination criteria corresponding to each item listed in the classification. As for the type of print medium, for example, "coated paper (gloss paper)" is given as a determination criterion. As for the basis weight, for example, "230 gram per square meter or more (2 in m2 is a superscript)" is given as a determination criteria. As for the volume resistivity, for example, "1.0E+11 Ω·cm" is given as a determination criterion. As for the environment "15 degrees Centigrade and 20% or less" is given as a determination criterion. In the present embodiment described with reference to FIG. 18, the precondition is managed by checking "15 millimeters from the rear end of the print medium" as a determination criterion in the "occurrence position of the abnormal image" as a classification.

In the present embodiment, the constraint condition management table (constraint condition management DB 4004) functions as a constraint condition management unit.

Figure 19:
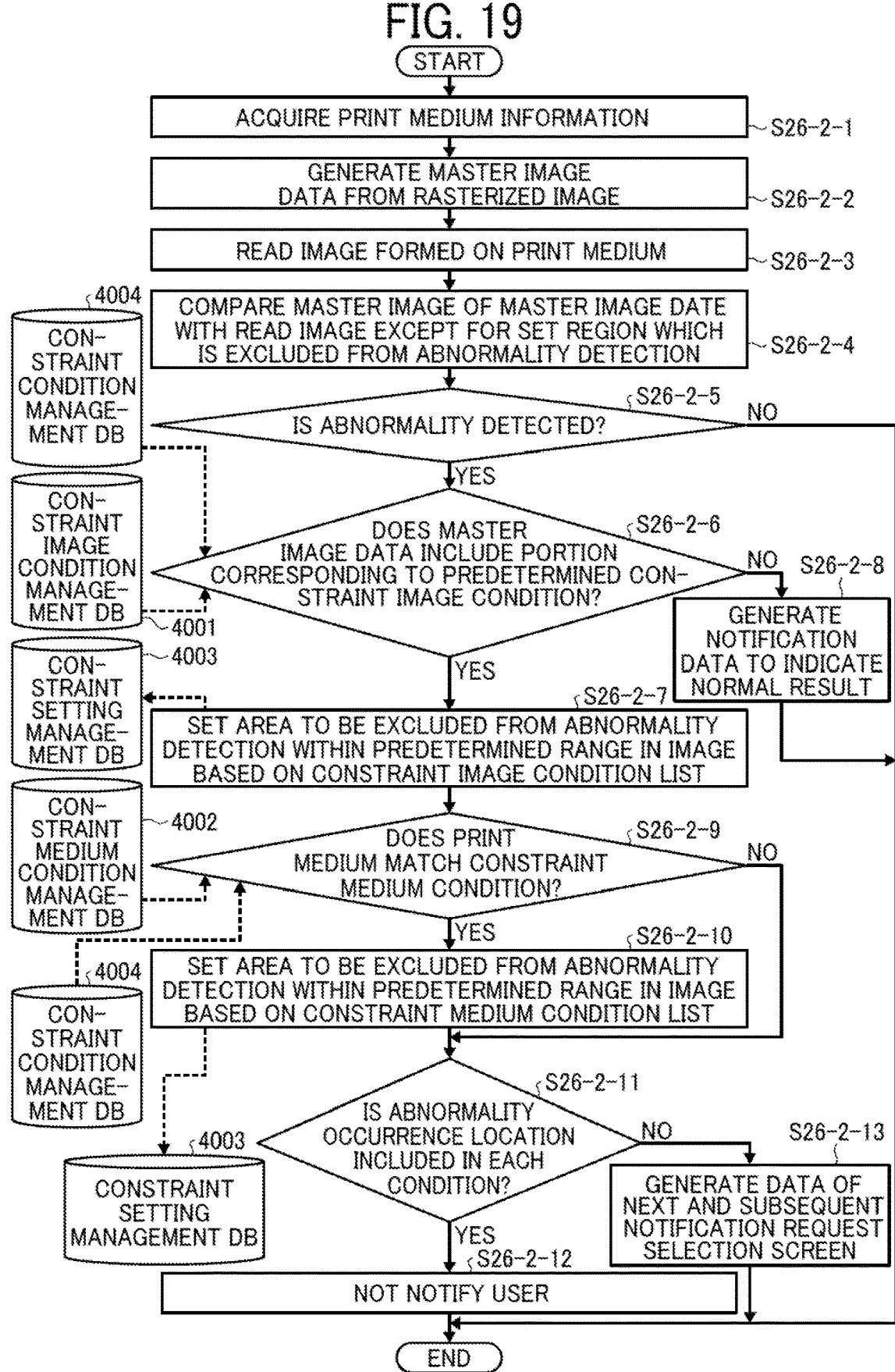
FIG. 19 is a flowchart of a detailed process of an image inspection process according to the second embodiment of the present disclosure.

FIG. 19 is a flowchart of a detailed process of the image inspection process, according to the second embodiment of the present disclosure.

Since the processing of steps S26-2-1 and S26-2-2 illustrated in FIG. 19 are substantially the same as the processing of steps S26-1-1 and S26-1-2 illustrated in FIG. 15, a redundant description thereof is omitted.

Subsequently, the reading and acquisition unit 42 reads (acquires) an image formed on the print medium (step S26-2-3). Specifically, the reading and acquisition unit 42 drives the reading device 410 to read (acquire) the image formed on the print medium.

Subsequently, the processing unit 48 compares the master image related to the master image data with the read image except for the set region that is not the abnormality detection target (step S26-2-4). To be more specific, the processing unit 48 compares the master image related to the master image data with the read image except for the region that is not the abnormality detection target indicated by the predetermined range set in step S26-1-6 of FIG. 15 from the comparison target.

Subsequently, the determination unit 45 determines whether an abnormality is present based on a result of the comparison between the master image and the read image (step S26-2-5). Specifically, the determination unit 45 compares the master image with the read (acquired) image and detects whether an abnormality satisfying the abnormality detection conditions is present.

When the determination unit 45 determines that an abnormality is present based on a result of the comparison between the master image and the read image (YES in step S26-2-5), the determination unit 45 determines whether a portion corresponding to the predetermined constraint image condition in the master image data is present (step S26-2-6).

Specifically, the determination unit 45 determines whether the master image data included in the master image matches the image condition indicated by the image condition of the constraint image condition management DB 4001 (see FIG. 9). For example, the determination unit 45 determines whether the master image data is configured with the high-density half tone (HT) image and the two-color (2C) image (image condition X). The determination unit 45 further determines whether each of the image condition and the media condition managed in the item of the classification of the constraint condition management DB 4004 (see FIG. 18) is managed as the precondition.

On the other hand, when the determination unit 45 determines that an abnormality is not present based on a result of the comparison between the master image and the read image (NO in step S26-2-5), the determination unit 45 ends the process.

At the time of the determination processing in step S26-2-6 described above, when two or more conditions are matched in addition to the precondition, the determination unit 45 may determine that these conditions match the constraint condition and may notify the user whether to set these conditions as exclusion targets. In this case, as for the type of the print medium, the basis weight, and the volume resistivity, a dedicated sheet brand database may be managed, and a determination condition such as "registered brand and 15 millimeters from the rear end of the print medium" may be set.

When the constraint image condition does not match and defects of the same pattern frequently occur under the same condition, the defect pattern may be learned such that the defect pattern can be set as the exclusion target.

As described above, since an image pattern (exclusion pattern) that is not recognized as an abnormal image can be set separately from a threshold value setting (such as the setting of the constraint image condition and the setting of the constraint medium condition), and an abnormal image (defect) more intended by the user can be detected.

When a portion corresponding to the predetermined constraint image condition in the master image data is present (YES in step S26-2-6), the calculation setting unit 46 sets a region to be excluded from the abnormality detection target in the image based on the constraint image condition list (step S26-2-7). To be more specific, in step S26-2-6, the calculation setting unit 46 converts the region to be excluded from the abnormality detection target, corresponding to the predetermined image condition, into the coordinate values of the corresponding region in the master image data. Then, the calculation setting unit 46 registers (stores) the converted coordinate values, as coordinate values of the region to be excluded from the abnormality detection target, in the constraint setting management DB 4003 (see FIG. 11).

On the other hand, when a portion corresponding to the predetermined constraint image condition in the master image data is not present (NO in step S26-2-6), the generating unit 47 generates normal notification data and ends the process (step S26-2-8).

Subsequently, the determination unit 45 determines whether the print medium matches the constraint medium condition (step S26-2-9). Specifically, the determination unit 45 determines whether the print medium used for printing matches the medium condition indicated by the medium condition of the constraint medium condition management DB 4002 (see FIG. 10). For example, the determination unit 45 determines whether the print medium is thick coated paper.

When the print medium matches the constraint medium condition (YES in step S26-2-9), the calculation setting unit 46 sets a region to be excluded from the abnormality detection target in a predetermined range in the image based on the constraint medium condition list (step S26-2-10). To be more specific, in step S26-1-5, the calculation setting unit 46 converts the region to be excluded from the abnormality detection target, corresponding to the predetermined image condition, into the coordinate values of the corresponding region in the master image data. Then, the calculation setting unit 46 registers (stores) the converted coordinate values, as coordinate values of the region to be excluded from the abnormality detection target, in the constraint setting management DB 4003 (see FIG. 11).

On the other hand, when the print medium does not match the constraint medium condition (NO in step S26-2-9), the image inspection apparatus 4 executes step S26-2-11 subsequently.

The region to be excluded from the abnormality detection target is managed by both the constraint image condition management DB 4001 (see FIG. 9) and the constraint medium condition management DB 4002 (see FIG. 10). Accordingly, depending on the combination of the image condition and the medium condition, two different regions to be excluded from the abnormality detection target may be set. In this case, similarly to the first embodiment, the process may be performed employing the logical add condition or the logical product condition of the regions to be excluded from the abnormality detection target.

Subsequently, the determination unit 45 determines whether an abnormality occurrence location is included in each condition (step S26-2-11). When the abnormality occurrence location is included in each condition (YES in step S26-2-11), the processing unit 48 ends the process without notifying the user (step S26-2-12).

On the other hand, when the abnormality occurrence location is not included in each condition (NO in step S26-2-11), the generating unit 47 generates notification request selection screen data related to the next and subsequent notification request selection screens and ends the process (step S26-2-13).

Troubleshooting may be provided to resolve the abnormal image of each constraint target. The image inspection apparatus 4 may guide the user to a site where the troubleshooting is provided, instead of the processing of not notifying the user in step S26-2-12.

The flowchart illustrated in FIG. 19 is given as an example, and the detailed processing related to the image inspection process described above is not limited thereto.

Figure 20:
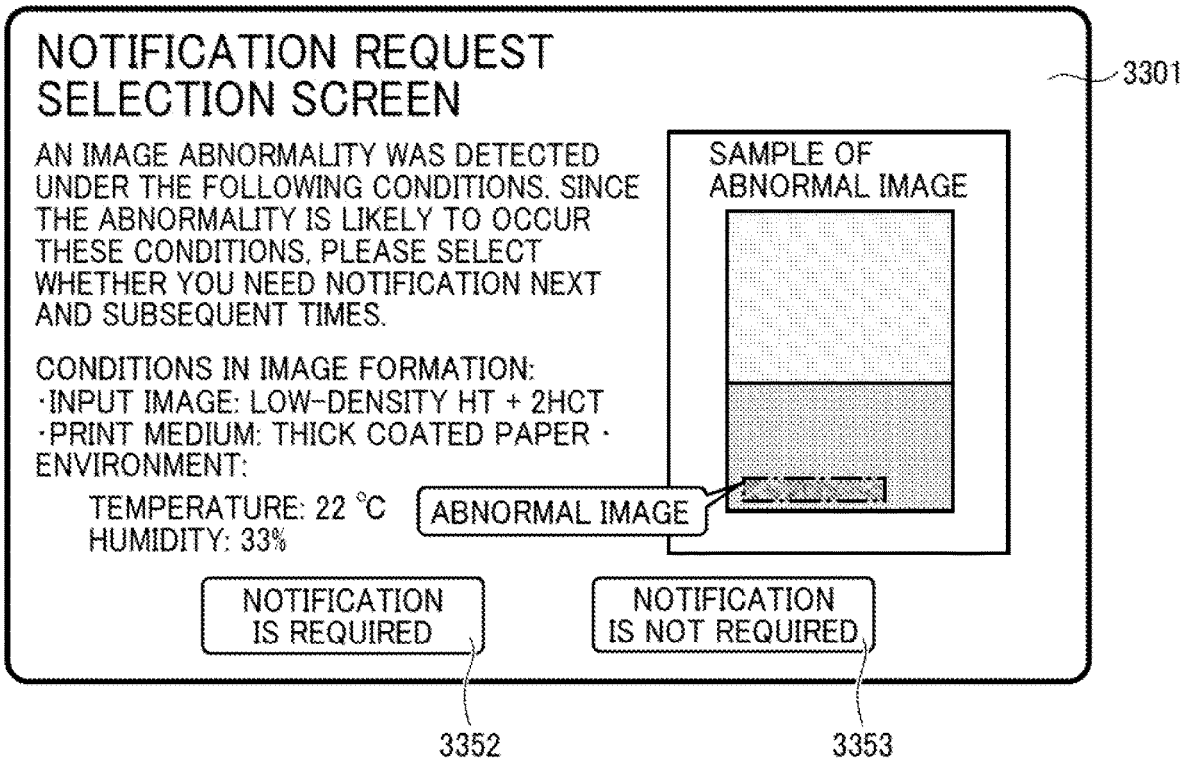
FIG. 20 is a diagram illustrating a display screen of a notification request selection, according to the second embodiment of the present disclosure.

FIG. 20 is a diagram illustrating a display screen of the notification request selection according to the second embodiment of the present disclosure.

As illustrated in FIG. 20, the display control unit 34 displays a notification request selection screen 3311 on the panel display 340*a* configuring the operation panel 340 of the image forming apparatus 3. Since an abnormality is detected in the image formed on the print medium and this condition is likely to cause an abnormality, a message prompting the selection of notification request of the next and subsequent notifications is displayed in the notification request selection screen 3311. In addition to the message, information related to the input image, information related to the print medium, and environmental information including temperature information and humidity information are displayed as conditions at the time of image formation. The display control unit 34 further displays the abnormal image samples in the notification request selection screen 3311. For example, a thumbnail image of the print medium on which the abnormal image occurs, a notification request button 3352 to request notification, and a notification no-request button 3353 are displayed. The user can confirm the notification information and operate either the notification request button 3352 or the notification no-request button 3353 to prevent such notification from being delivered when the user does not desire the next and subsequent notifications.

As described above, according to the present embodiment, the image inspection apparatus 4 compares the master image with the read image to determine whether an abnormality is present, and then determines whether a portion where an abnormality is present is included in the constraint condition. As a result, the process of determining whether a constraint is imposed on an image alone in which an abnormality is present can be executed.

Each of the functions of the embodiments described above can be implemented by one or more processing circuits or circuitry. The "processing circuit or circuitry" in the present disclosure includes a device programmed to execute each function by software, such as a processor implemented by an electronic circuit. The device may be, for example, a processor, an application specific integrated circuit (ASIC) designed to perform the functions described above, a digital signal processor (DSP), a field programmable gate array (FPGA), a system on a chip (SOC), a graphics processing unit (GPU), or a circuit module.

In the embodiments of the present disclosure described above, the image inspection system may be configured to execute the abnormality detection process by machine learning such as an artificial intelligence (AI). In this case, for example, even if a portion where an abnormality is present does not match the constraint image condition and defects of the same pattern frequently occur under the same condition, the image inspection apparatus 4 may learn defect patterns by machine learning such that the defect patterns can be set as an exclusion target. The image inspection apparatus 4 may provide a user interface (UI) for displaying the learned defect patterns to the user.

Although the image inspection apparatus, the image forming apparatus, the image inspection system, the image inspection method, and the program according to embodiments of the present disclosure have been described above, the above-described embodiments are illustrative and do not limit the present disclosure. The above-described embodiments of the present disclosure may be modified within a range that can be conceived by those skilled in the art. The modification includes additions of other embodiments, modifications, and deletions. The modifications are included in the scope of the present disclosure as long as the actions and effects of the present disclosure are provided.

A description is given below of some aspects of the present disclosure.

Aspect 1

The image inspection apparatus 4 (serves as an image inspection apparatus, hereinafter omitted) as a first aspect includes the calculation setting unit 46 (serves as a setting unit, hereinafter omitted), the reading and acquisition unit 42 (serves as an acquisition unit, hereinafter omitted), and the detection unit 43 (serves as a detection unit, hereinafter omitted). The calculation setting unit 46 sets abnormality detection conditions to detect an abnormality occurring in an image formed on a print medium based on input image data. The abnormality detection conditions set by the calculation setting unit 46 exclude specific conditions specified from at least one of input image information related to the input image data and print medium information related to the print medium. The reading and acquisition unit 42 acquires an image formed on the print medium. The detection unit 43 detects whether an abnormality satisfying the abnormality detection conditions excluding the specific conditions has occurred in the acquired image.

According to Aspect 1, the image inspection apparatus 4 easily distinguishes between an abnormality that is not to be detected and an abnormality that is to be detected for an abnormality that occurs in an image formed on the print medium.

Aspect 2

In the image inspection apparatus 4 described in Aspect 1, the calculation setting unit 46 of the image inspection apparatus 4 sets the abnormality detection conditions excluding specific conditions according to environmental information indicated by temperature information related to the temperature around the print medium and humidity information related to the humidity around the print medium.

According to Aspect 2, in addition to the effect of Aspect 1, the abnormality detection conditions to which information on temperature and humidity is added are set.

Aspect 3

In the image inspection apparatus 4 described in Aspect 1 or Aspect 2, the calculation setting unit 46 of the image inspection apparatus 4 sets the abnormality detection conditions excluding a specific condition related to a white void image in which an image of a predetermined distance is missing at a switching portion of a plate for each color forming an image and an abnormal image occurring at a predetermined distance from the rear end of the print medium with respect to a conveyance direction of the print medium.

According to Aspect 3, in addition to the effect of Aspect 1 or Aspect 2, when a specific abnormal image recognized in advance occurs, the specific abnormal image is excluded from the abnormal images.

Aspect 4

In the image inspection apparatus 4 described in any one of Aspects 1 to 3, the calculation setting unit 46 of the image inspection apparatus 4 sets the abnormality detection conditions excluding specific conditions in accordance with the number of lines information, density information, color information, and halftone mode information of an image included in the input image information.

According to Aspect 4, in addition to the effect of any one of Aspects 1 to 3, the calculation setting unit 46 of the image inspection apparatus 4 sets the abnormality detection conditions in accordance with the type of the input image.

Aspect 5

In the image inspection apparatus 4 described in any one of Aspects 1 to 3, the calculation setting unit 46 of the image inspection apparatus 4 sets the abnormality detection conditions excluding specific conditions in accordance with the type of information related to the type of the print medium and the characteristic information related to the characteristic of the print medium included in the print medium information.

According to Aspect 5, in addition to the effect of any one of Aspects 1 to 3, the calculation setting unit 46 of the image inspection apparatus 4 sets the abnormality detection conditions in accordance with the type of the print medium.

Aspect 6

In the image inspection apparatus 4 described in any one of Aspects 1 to 5, the reading and acquisition unit 42 of the image inspection apparatus 4 acquires input image information, print medium information, and the environmental information transmitted by the DFE 5 (serves as management server, hereinafter omitted) that manages the input image data, as abnormality detection conditions excluding specific conditions.

According to Aspect 6, in addition to the effect of any one of Aspects 1 to 5, the reading and acquisition unit 42 of the image inspection apparatus 4 acquires various kinds of information for setting the abnormality detection conditions from the outside of the image inspection apparatus 4.

Aspect 7

The image forming apparatus 3 includes the image inspection apparatus 4 described in any one of Aspects 1 to 6, and a forming unit that forms an image on the print medium based on the input image data.

According to Aspect 7, in addition to the effect of any one of Aspects 1 to 6, the image forming apparatus including a function of detecting an abnormal image is provided.

Aspect 8

The image inspection system 1 includes the DFE 5 (serves as a management server, hereinafter omitted) that generates an input image for forming an image, the image forming apparatus 3 (serves as an image forming apparatus, hereinafter omitted) that forms the image on a print medium based on input image data, and the image inspection apparatus 4 (serves as an inspection apparatus, hereinafter omitted) that inspects the image formed on the printing medium. The DFE 5 includes a transmission and reception unit 51 (serves as a transmitter, hereinafter omitted) that transmits input image information related to the input image and print medium type information indicating the type of the print medium to the image forming apparatus 3. The image forming apparatus 3 includes a generation and formation unit 37 that forms the image on the print medium based on the input image data. The image inspection apparatus 4 includes a calculation setting unit 46 (serves as a setting unit, hereinafter omitted), a reading and acquisition unit 42 (serves as an acquisition unit, hereinafter omitted), and a detection unit 43 (serves as a detection unit, hereinafter omitted). The calculation setting unit 46 sets abnormality detection conditions to detect an abnormality occurring in the image formed on the print medium based on the input image data. The abnormality detection conditions set by the calculation setting unit 46 exclude specific conditions specified from at least one of the input image information related to the input image data and the print medium information related to the print medium. The reading and acquisition unit 42 acquires the image formed on the print medium. The detection unit 43 detects whether an abnormality satisfying the abnormality detection conditions has occurred in the acquired image.

According to Aspect 8, similarly to Aspect 1, the image inspection system 1 easily distinguishes between an abnormality that is not to be detected and an abnormality that is to be detected for an abnormality that occurs in an image formed on the print medium.

Aspect 9

In the inspection system 1 described in Aspect 8, the DFE 5 includes an operation reception unit 52 (serves as a reception unit) that receives an input of at least one of the input image information and the print medium information configuring the abnormality detection conditions.

According to Aspect 9, in addition to the effect of Aspect 8, the management server receives at least one of the input image information and the print medium information.

Aspect 10

An image inspection method according to Aspect 10 is performed by an image inspection apparatus for inspecting an image formed on a print medium. The image inspection method includes: setting abnormality detection conditions to detect an abnormality occurring in an image formed on a print medium based on input image data, and excluding specific conditions specified from at least one of input image information related to the input image data and print medium information related to the print medium from the abnormality detection conditions; acquiring the image formed on the print medium; and detecting whether an abnormality satisfying the abnormality detection conditions has occurred in the acquired image.

According to Aspect 10, similarly to Aspect 1, the image inspection method easily distinguishes between an abnormality that is not to be detected and an abnormality that is to be detected for an abnormality that occurs in an image formed on the print medium.

Aspect 11

A program as Aspect 11 is performed by an image inspection apparatus for inspecting an image formed on a print medium. The program causes the image inspection apparatus to execute a process. The process includes: setting abnormality detection conditions to detect an abnormality occurring in an image formed on a print medium based on input image data, and excluding specific conditions specified from at least one of input image information related to the input image data and print medium information related to the print medium from the abnormality detection conditions; acquiring the image formed on the print medium; and detecting whether an abnormality satisfying the abnormality detection conditions has occurred in the acquired image.

According to Aspect 11, similarly to Aspect 1, the program easily distinguishes between an abnormality that is not to be detected and an abnormality that is to be detected for an abnormality that occurs in an image formed on the print medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image inspection apparatus comprising:
processing circuitry configured to:
set abnormality detection conditions excluding specific conditions specified from at least one of input image information related to input image data and print medium information related to a print medium;
acquire an image formed on the print medium based on the input image data; and
detect whether an abnormality satisfying the abnormality detection conditions excluding the specific conditions has occurred in the acquired image,
wherein the processing circuitry sets the abnormality detection conditions excluding the specific conditions related to a white void image and an abnormal image, the white void image having an image of a predetermined distance that is missing at a switching portion of a plate for each color forming the image, and the abnormal image occurring at a predetermined distance from a rear end of the print medium with respect to a conveyance direction of the print medium.

2. The image inspection apparatus according to claim 1, wherein the processing circuitry sets the abnormality detection conditions excluding the specific conditions according to environmental information indicated by temperature information related to a temperature around the print medium and humidity information related to a humidity around the print medium.

3. The image inspection apparatus according to claim 1, wherein the processing circuitry sets the abnormality detection conditions excluding the specific conditions in accordance with a type of information related to the type of the print medium and characteristic information related to a characteristic of the print medium included in the print medium information.

4. The image inspection apparatus according to claim 1, wherein the processing circuitry acquires the input image information, the print medium information, and environmental information, each transmitted by a management server that manages the input image data, as the abnormality detection conditions excluding the specific conditions.

5. An image forming apparatus comprising:
the image inspection apparatus according to claim 1; and
at least one image forming unit that forms the image on the print medium based on the input image data.

6. An image inspection system comprising:
a management server including server circuitry;
an image forming apparatus including an image forming unit; and
the image inspection apparatus according to claim 1;
wherein the image inspection apparatus inspects the image formed on the print medium, the image inspection apparatus including the processing circuitry,
the server circuitry being configured to generate the input image data and transmit input image information related to the input image data and print medium type information indicating a type of the print medium to the image forming apparatus, and
the image forming unit being configured to form the image on the print medium based on the input image data.

7. The image inspection apparatus according to claim 1, wherein the processing circuitry sets the abnormality detection conditions excluding the specific conditions in accordance with a type of information related to the type of the print medium and characteristic information related to a characteristic of the print medium included in the print medium information, and
wherein the processing circuitry sets the abnormality detection conditions excluding the specific conditions according to environmental information indicated by temperature information related to a temperature around the print medium and humidity information related to a humidity around the print medium.

8. The image inspection apparatus according to claim 1, wherein the processing circuitry sets the abnormality detection conditions excluding the specific conditions in accordance with a type of information related to the type of the print medium and characteristic information related to a characteristic of the print medium included in the print medium information, wherein the processing circuitry sets the abnormality detection conditions excluding the specific conditions according to environmental information indicated by temperature information related to a temperature around the print medium and humidity information related to a humidity around the print medium, and wherein the processing circuitry sets the abnormality detection conditions excluding the specific conditions in accordance with a number of lines information, density information, color information, and halftone mode information of the image included in the input image information.

9. An image inspection apparatus comprising:

processing circuitry configured to:

set abnormality detection conditions excluding specific conditions specified from at least one of input image information related to input image data and print medium information related to a print medium;

acquire an image formed on the print medium based on the input image data; and detect whether an abnormality satisfying the abnormality detection conditions excluding the specific conditions has occurred in the acquired image, wherein the processing circuitry sets the abnormality detection conditions excluding the specific conditions in accordance with a number of lines information, density information, color information, and halftone mode information of the image included in the input image information.

10. The image inspection apparatus according to claim 9, wherein the processing circuitry sets the abnormality detection conditions excluding the specific conditions according to environmental information indicated by temperature information related to a temperature around the print medium and humidity information related to a humidity around the print medium.

11. The image inspection apparatus according to claim 9, wherein the processing circuitry sets the abnormality detection conditions excluding the specific conditions in accordance with a type of information related to the type of the print medium and characteristic information related to a characteristic of the print medium included in the print medium information.

12. The image inspection apparatus according to claim 9, wherein the processing circuitry acquires the input image information, the print medium information, and environmental information, each transmitted by a management server that manages the input image data, as the abnormality detection conditions excluding the specific conditions.

13. An image forming apparatus comprising:

the image inspection apparatus according to claim 9; and at least one image forming unit that forms the image on the print medium based on the input image data.

14. An image inspection system comprising:

a management server including server circuitry;

an image forming apparatus including an image forming unit; and the image inspection apparatus according to claim 9 that inspects the image formed on the print medium, the image inspection apparatus including the processing circuitry, the server circuitry being configured to generate the input image data and transmit input image information related to the input image data and print medium type information indicating a type of the print medium to the image forming apparatus, and the image forming unit being configured to form the image on the print medium based on the input image data.

* * * * *